United States Patent [19]
Nakajima

[11] Patent Number: 5,537,561
[45] Date of Patent: Jul. 16, 1996

[54] PROCESSOR

[75] Inventor: Masaitsu Nakajima, Osaka, Japan

[73] Assignee: Matsushita Electric Industrial Co., Ltd., Osaka, Japan

[21] Appl. No.: 315,505

[22] Filed: Sep. 30, 1994

Related U.S. Application Data

[63] Continuation of Ser. No. 801,666, Dec. 2, 1991, abandoned.

[30] Foreign Application Priority Data

Nov. 30, 1990 [JP] Japan .................... 2-340460

[51] Int. Cl.$^6$ .................................. G06F 9/38
[52] U.S. Cl. .................... 395/375; 364/DIG. 1; 364/DIG. 2
[58] Field of Search .................... 395/375, 800, 395/650

[56] References Cited

U.S. PATENT DOCUMENTS

| | | | |
|---|---|---|---|
| 4,750,112 | 6/1988 | Jones et al. | 364/200 |
| 4,760,519 | 7/1988 | Papworth et al. | 364/200 |
| 4,777,594 | 10/1988 | Jones et al. | 364/200 |
| 4,789,925 | 12/1988 | Lahti | 364/200 |
| 4,858,105 | 8/1989 | Kuriyama et al. | 364/200 |
| 4,969,117 | 11/1990 | Mirankev | 364/730 |
| 5,155,816 | 10/1992 | Kohn | 395/375 |

OTHER PUBLICATIONS

Instruction Issue Logic for High–Performance Intempliple, Multiple Functional Unit Pipelined Computers, by Sohi IEEE Mar. 1990, pp. 349–359.
Intel's 80960, by Ryan, IEEE Jun. 1988 Publication, pp. 63–76.
The 1960CA Supersealar Implementation Of The 80960 Architecture, by McGeady, 1990 IEEE Publication, pp. 232–240.
Parallel Multi–Contex Architecture with High–Speed Synchronization Mechanism by Shimada et al IEEE Feb. 1991, Publication.

*Primary Examiner*—Parshotam S. Lall
*Assistant Examiner*—Zarni Maung
*Attorney, Agent, or Firm*—Wenderoth, Lind & Ponack

[57] ABSTRACT

A processor with a plurality of operational pipelines for performing parallel processing which is includes an instruction processing section with a plurality of instruction processing pipelines and an instruction processing control section with a plurality of instruction processing control pipelines. The instruction processing control section has an instruction issuing control section which issues decoded instructions after adding tags representing data dependency between successive instructions and a pipe lock signal generating section which generates pipe lock signals for locking the pipelines until further processing is allowed.

8 Claims, 29 Drawing Sheets

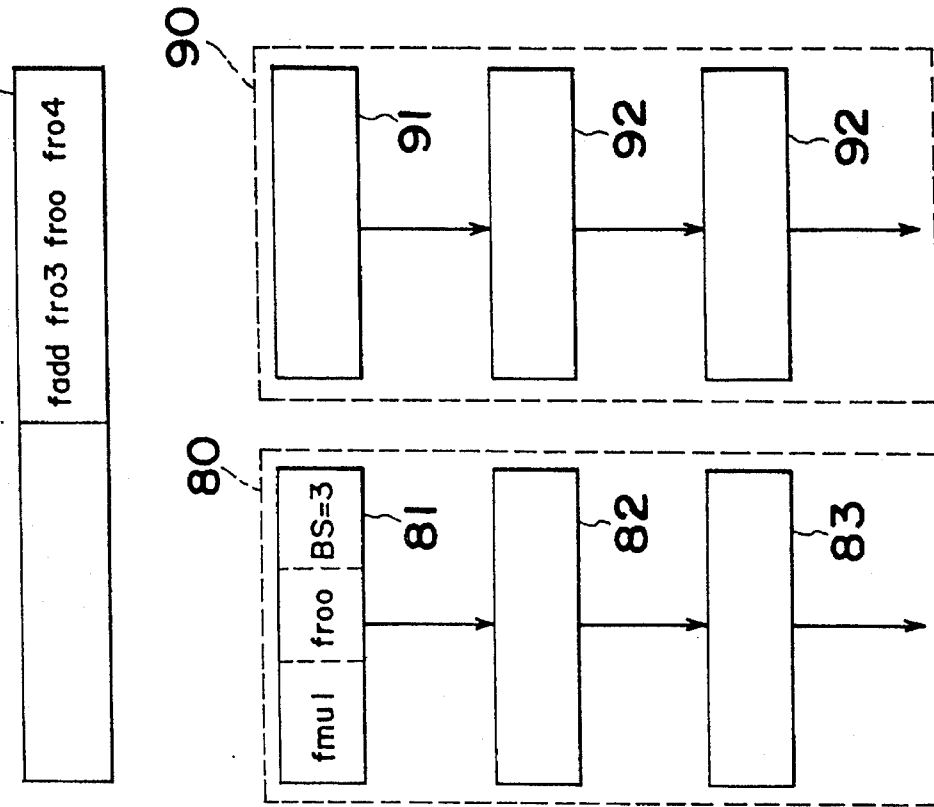
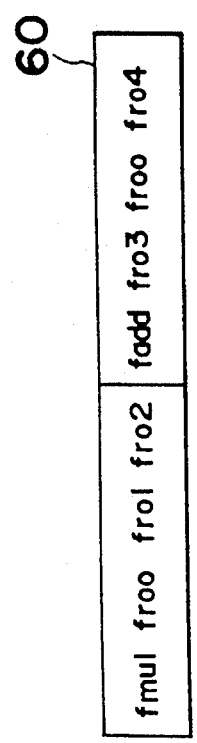
Fig. 14(a)
Fig. 14(b)

PROCESSOR

This application is a Continuation of now abandoned application Ser. No. 07/801,666, filed Dec. 2, 1991, now abandoned.

BACKGROUND OF THE INVENTION

1. Field of the Invention

The present invention generally relates to a processor and more particularly, to a controlling system designed to control parallel-processing of instructions in a processor provided with a plurality of operational pipelines.

2. Description of the Prior Art

In order to keep consistency of programs in a processor having a plurality of processing sections for parallel processing of instructions, it is necessary to process the instructions while Securing the data dependency therebetween as described below.

(1) Flow Dependency

In the case of a program including two instructions as follows;

fmul fr00 fr01 fr02
fadd fr03 fr00 fr04, the result obtained by execution of an instruction fmul is stored in fr00, and is used to process the next instruction fadd. Therefore, the instruction fadd cannot be processed until the result of the instruction fmul is output. Such a dependency of data is called a flow dependency. In this case, the instructions fmul and fadd are respectively called a preceding instruction and a succeeding instruction.

(2) Inverse Dependency

In the case of a program including two strings of instructions as follows;

fmul fr01 fr00 fr02
fadd fr00 fr03 fr04, the preceding instruction fmul uses the data of fr00 as input data, and thereafter, the succeeding instruction fadd stores the result in fr00. Therefore, the data obtained by the succeeding instruction cannot be written into the register until the data stored in the register is completely read out therefrom for executing the preceding instruction. This relationship of data is called an inverse dependency.

(3) Output Dependency

In the case of a program including two instructions as follows;

fmul fr00 fr01 fr02
fadd fr00 fr03 fr04, the result obtained by executing the succeeding instruction fadd should be stored in fr00. Therefore, the data obtained by executing the succeeding instruction cannot be written into the register before the data obtained by executing the preceding instruction is written into the register. This is called an output dependency.

Hereinbelow, two prior art parallel processing arrangements with the data dependencies as noted above will be depicted.

One prior art arrangement is the scoreboard algorithm of Thornton used in the CDC6600 machine of Control Data Inc. which is described in detail in "Instruction Issue Logic in Pipelined Supercomputers" by SHLOMO WEISSE & JAMES E. SMITH or "6.7 Advanced Pipelining-Dynamic Scheduling in pipelines" in "Computer Architecture A Quantitative Approach" by John L. Hennessy & David A. Patterson.

According to the scoreboard algorithm, the issuance of an instruction is controlled using a tag which is attached to a register and called a scoreboard. In other words, a tag is set for a register for which the writing of data is reserved, and the tag is reset when the writing is finished. In the case where an instruction having the flow dependency is detected in the register for which the tag is set, the issuance of the instruction of the flow dependency alone is controlled until the data is written into the register, and therefore the other instructions can be sequentially issued. If an instruction having the inverse dependency or output dependency is detected, the issuance of all of the instructions is prohibited until the detected dependency is solved.

The other prior art arrangement is the algorithm of Tomasulo employed in system 360/Mode 91 of IBM Corp. which is also revealed in the aforementioned texts or discussed in more detail "An Efficient Algorithm for Exploiting Multiple Units" by R. M. Tomasulo.

It is characteristic of Tomasulo's algorithm that each operating unit is equipped with a waiting buffer called a reservation station to wait for input data, and feeds its output to a common bypass bus called a common data bus. Each waiting buffer stores tag information such as the name of a register, etc. of the read input data or not-yet-read data and therefore, even an instruction with data dependency can be fed to the waiting buffer. The inverse dependency and output dependency can be solved without restricting the issuance of an instruction if the name of a register in the waiting buffer is changed. When the flow dependency is detected, the succeeding instruction is kept waiting in the waiting buffer, as in the above scoreboard algorithm, until the preceding instruction is completely executed. However, since the result obtained by the preceding instruction is output to the common bus, it is not necessary to wait for the result to be written into the register, but processing of the succeeding instruction can be started by bypassing the data on the common bus.

As is discussed hereinbelow, according to Thornton's algorithm, the issuance of all of the instructions is prohibited when an inverse dependency or output dependency is detected, whereby the processing efficiency is disadvantageously deteriorated. Moreover, since the succeeding instruction cannot be issued until the preceding instruction has completed the writing of the data, this also lowers the processing efficiency.

Meanwhile, according to Tomasulo's algorithm, the hardware results in a bulky structure because of the installation of waiting buffers. It is further problematic that it is difficult for the waiting buffers to be controlled and the output data on the common bus might compete with each other to decrease the efficiency.

SUMMARY OF THE INVENTION

The object of the present invention is therefore to provide a processor of high efficiency which is capable of performing instructions in parallel while securing a data dependency.

In order to achieve the aforementioned object, a processor is provided according to the present invention which comprises an instruction processing part and a processing controlling part. In the instruction processing part, first to Nth operational pipelines are provided in L stages, having data output ports from the Lth stage, with a pair of input data registers in the first stage and on first to an (L−1)th pipeline registers in each stage except for the first stage. A register file has 2N read ports and N write ports. Moreover, a bypass network is provided in the instruction processing part, so that optional data selected by a bypass controlling signal is output to the input data registers in each of the first to Nth operational pipelines, N write ports of the register file and a data memory using the outputs from the output ports of the Lth stage of each of the first to Nth operational pipelines, from the 2N read ports of the register file and from the data memory. Meanwhile, the processing controlling part is comprised of M instruction registers capable of fetching an instruction from an instruction memory and storing M (M>=N) instructions, an instruction analyzing part which analyzes the M instructions stored in the M instruction registers so as to thereby generate N pieces of operation controlling information to control the N operational pipelines, first to Nth operation controlling pipelines corresponding to the first to Nth operational pipelines the controlling pipelines consisting of controlling registers in L stages wherein the N pieces of the operation controlling information generated in the instruction analyzing part are input and stored for each stage, an instruction issuance controlling part which, using the N pieces of operation controlling information generated in the instruction analyzing part and the operation controlling information for each stage of the pipeline stored in the controlling registers of the N operation controlling pipelines, generates a bypass controlling signal and at the same time, controls the operation controlling pipelines and instruction analyzing part so as to thereby control the issuance of the instruction, and a pipe locking signal generating part which determines, using the operation controlling information stored in the controlling registers of the first to Nth operation controlling pipelines as an input, whether to proceed the pipeline to a next stage, so as to thereby output first to Nth pipe locking signals to restrict the advancement of the pipeline to the first to Nth operational pipelines, the first to Nth operation controlling pipelines and the instruction issuance controlling part. Accordingly, when data needed for an optional operational pipeline to execute an optional instruction from the instruction register is output and written into the input register, the necessary operation controlling information for the operation controlling pipeline is simultaneously output and written into the controlling register, thus completing the issuance of the instruction.

In the above-described structure of the processor, even if an instruction has an inverse dependency or output dependency, it is possible to issue the instruction. Moreover, even if an instruction has a flow dependency, the succeeding instruction can be issued with the minimum overhead operation.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which:

FIGS. 11(a), 11(b), 11(c), 11(d)-1, 11(d)-2 and 11(e) are explanatory diagrams for respectively showing progressing states of the processing control pipelines when an instruction for preventing the progress of the pipelines is registered in the first stage of the first pipeline locked by a first pipe lock signal and instructions having an output dependency therebetween are stored in the instruction register;

FIGS. 14(a), 14(b), 14(c) and 14(d) are explanatory diagrams for respectively showing the progressing states of the processing control pipelines when instructions having another flow dependency therebetween are fetched in the instruction register;

DETAILED DESCRIPTION OF THE PREFERRED EMBODIMENT

A preferred embodiment of the present invention will be discussed hereinbelow with reference to the accompanying drawings.

Referring first to the block diagram of FIG. 1, the structure of a first processor according to one preferred embodiment of the present invention is described below.

Figure 1:
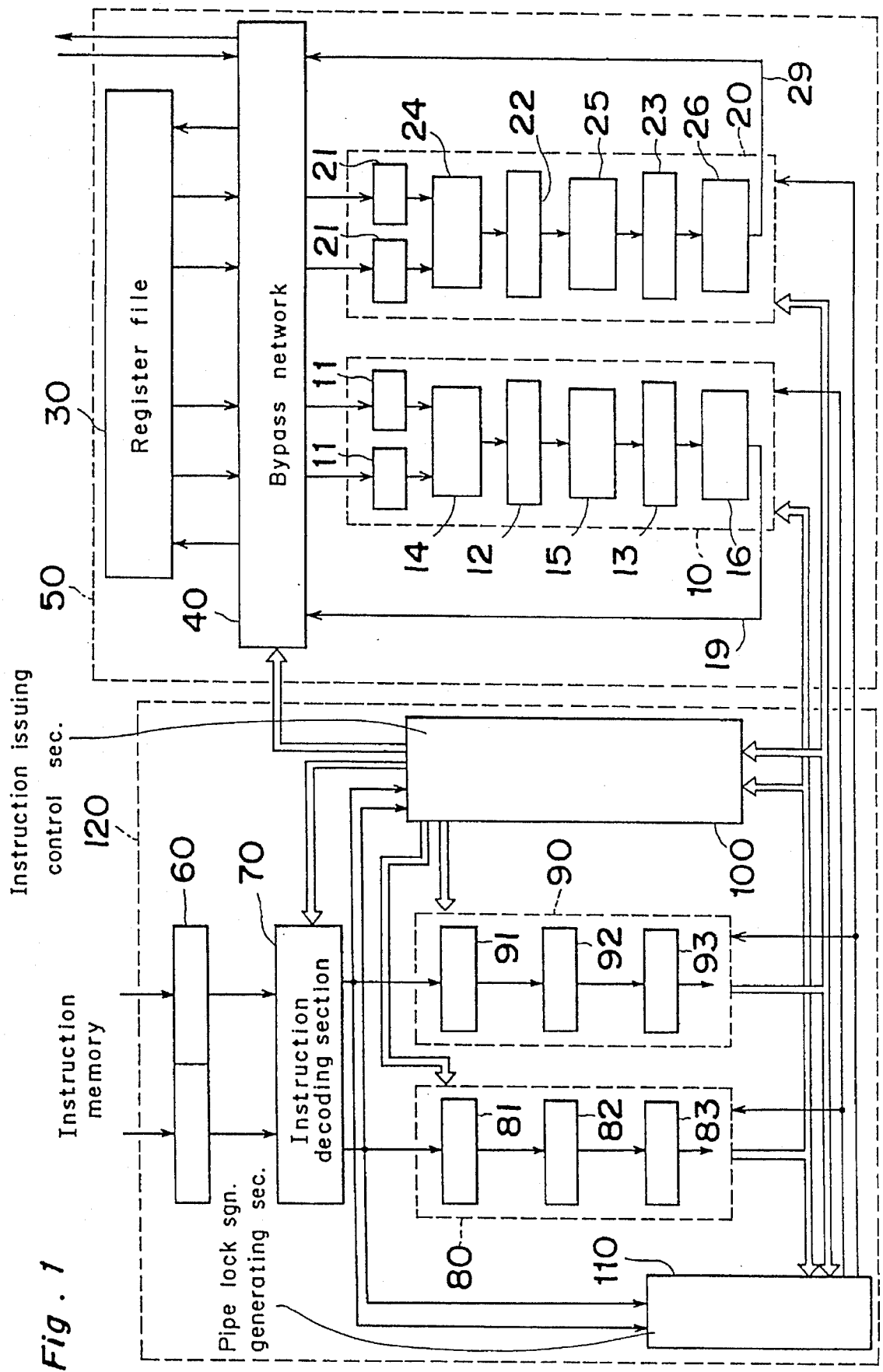
FIG. 1 is a block diagram of a first processor according to a first preferred embodiment of the present invention.
Figure 3:
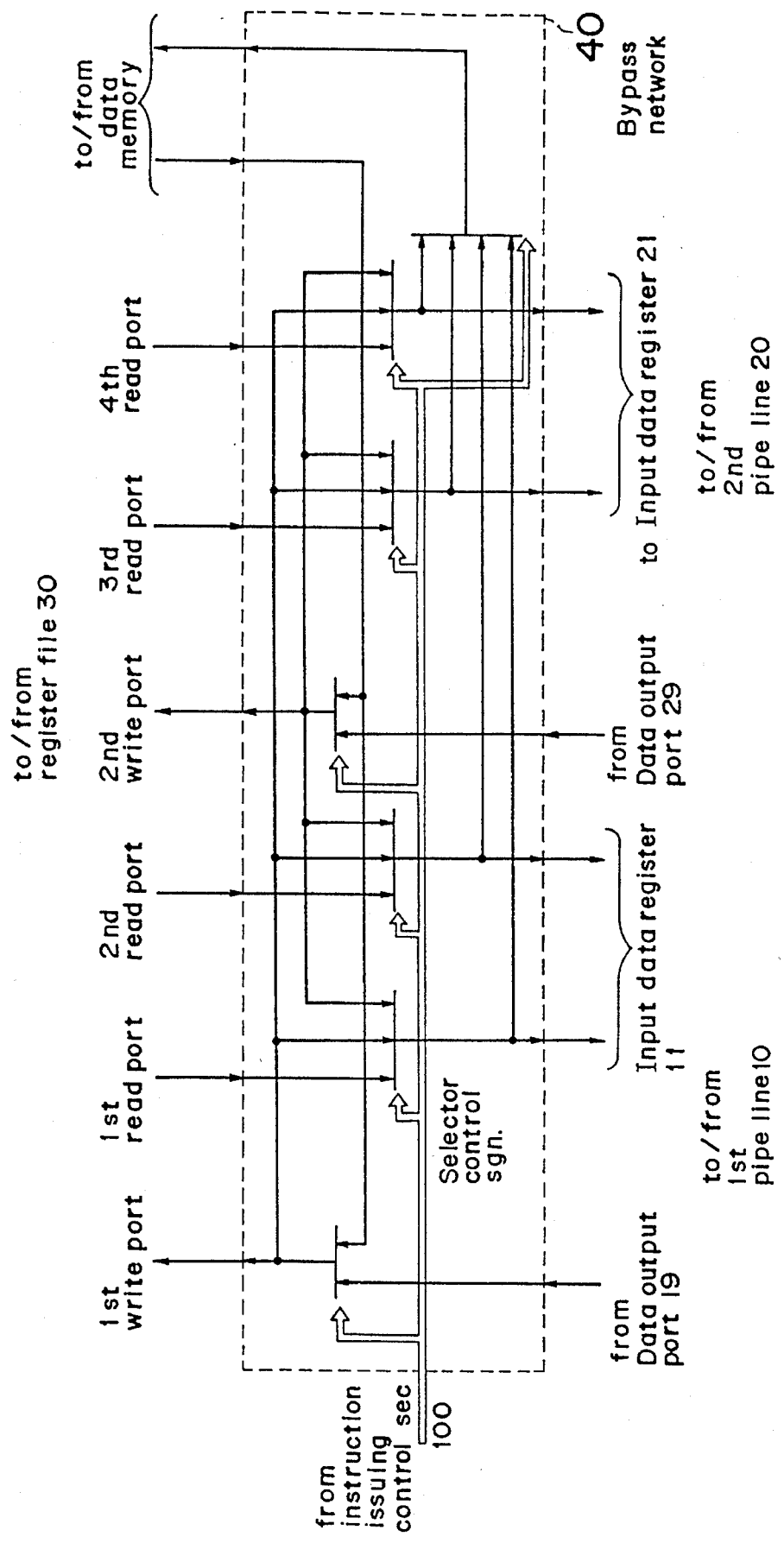
FIG. 3 is a conceptional diagram for showing a composition of the bypass network shown in FIG. 1.
Figure 4:
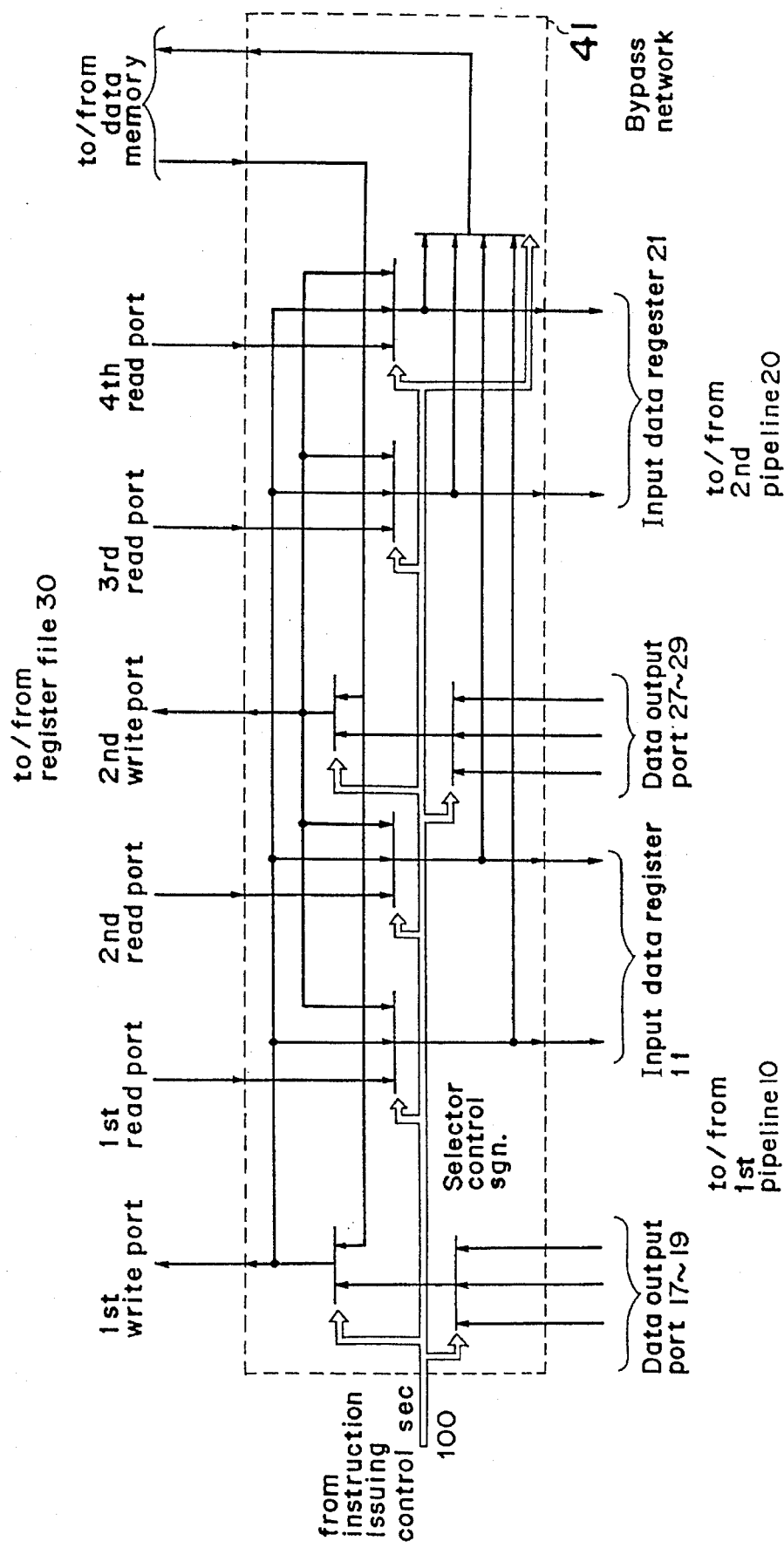
FIG. 4 is a conceptional diagram for showing a composition of the bypass network shown in FIG. 2.

Elements 10 and 20 in FIG. 1 are respectively first and second operational pipelines. For simplifying the description hereinafter, the processor of the embodiment is assumed to have two operational pipelines, and each of the first and second operational pipelines 10 and 20 is assumed to have three stages of processing pipelines. The first and second operational pipelines 10 and 20 are respectively comprised of a pair of input data registers 11 and 21 for latching and supplying input data to a first stage of the processing pipeline, first and second pipeline registers 12 and, 13 and 22 and, 23 for latching the data from the previous stage and for supplying the data to second and third stages of the pipelines, and operating parts 14–16 and 24–26 for performing an operation for each stage of the pipeline. The final operation result is output from the third stage of the pipeline through respective output ports 19 and 29 of the first and second operational pipelines 10 and 20. A register file 30 has 2*2=4 read ports and 2 write ports. A bypass network 40 outputs data to the two write ports and input data registers 11 and 21 of the operational pipelines 10 and 20 when data outputs from the data output ports 19 and 29 of the first and second operational pipelines 10 and 20, from a data memory and from the four read ports of the register file 30 are input thereto. FIG. 3 shows a concrete structure of the bypass network 40. Data read and data write operations in the bypass network 40 are selectively effected in accordance with selector control signals sent from an instruction issuing control section 100 which will be explained hereafter. An instruction processing part 50 of the processor is in the aforementioned structure.

Meanwhile, a processing controlling part 120 is constituted as indicated below. An instruction register 60 for fetching instructions from an external instruction memory is assumed to store two instructions at most for brevity of the description. The instruction stored in the instruction register 60 is read and the corresponding operation controlling information is output from an instruction decoding second 70. The operation controlling information referred to here includes, for example, information to instruct an operation itself such as an adding operation or a multiplying operation, and information to fulfill an instruction such as the name of a register storing the input data or the name of a register to which the data is to be written, and the like. A first operation controlling pipeline 80, upon receipt of an input of the operation controlling information from the instruction analyzing part 70, transmits the operation controlling information to each stage of the processing pipeline of the first operational pipeline 10. The first operation controlling pipeline 80 has three stages of controlling registers 81, 82 and 83 for controlling the three stages of, the processing pipelines. Each stage of the controlling register 81, 82 and 83 stores the operation controlling information to control one stage of the pipeline of the first operational pipeline 10. On the other hand, a second operation controlling pipeline 90 with three stages of controlling registers 91, 92 and 93 transmits the operation controlling information to each stage of the processing pipeline of the second operational pipeline 20 when the operation controlling information output from the instruction decoding part 70 is input thereto. The operation controlling information for each stage of the processing pipeline of the second operational pipeline 20 is stored in the corresponding controlling register. An instruction issuance controlling part 100 outputs a bypass controlling signal to control the bypass network 40 when receiving the operation controlling information output from the first and second operation controlling pipelines 80 and 90, and the operation controlling information from the instruction decoding part 70. At the same time, the instruction issuance controlling part 100 outputs a controlling signal to the instruction decoding part 70, first operation controlling pipeline 80 and second operation controlling pipeline 90, so as to thereby control the issuance of the instruction. A pipeline locking signal generating part 110 decides whether it is permitted to proceed to the next stage of the processing pipeline in each of the first and second operational pipelines 10 and 20 when it receives an input of the operation controlling information from the first and second operation controlling pipelines 80 and 90. If it is not permitted, the locking signal generating part 110 generates a first or a second pipeline locking signal to restrict the advancement to the next stage of the first operational pipeline 10 and first operation controlling pipeline 80 or, of the second operational pipeline 20 and second operation controlling pipeline 90.

Figure 5:
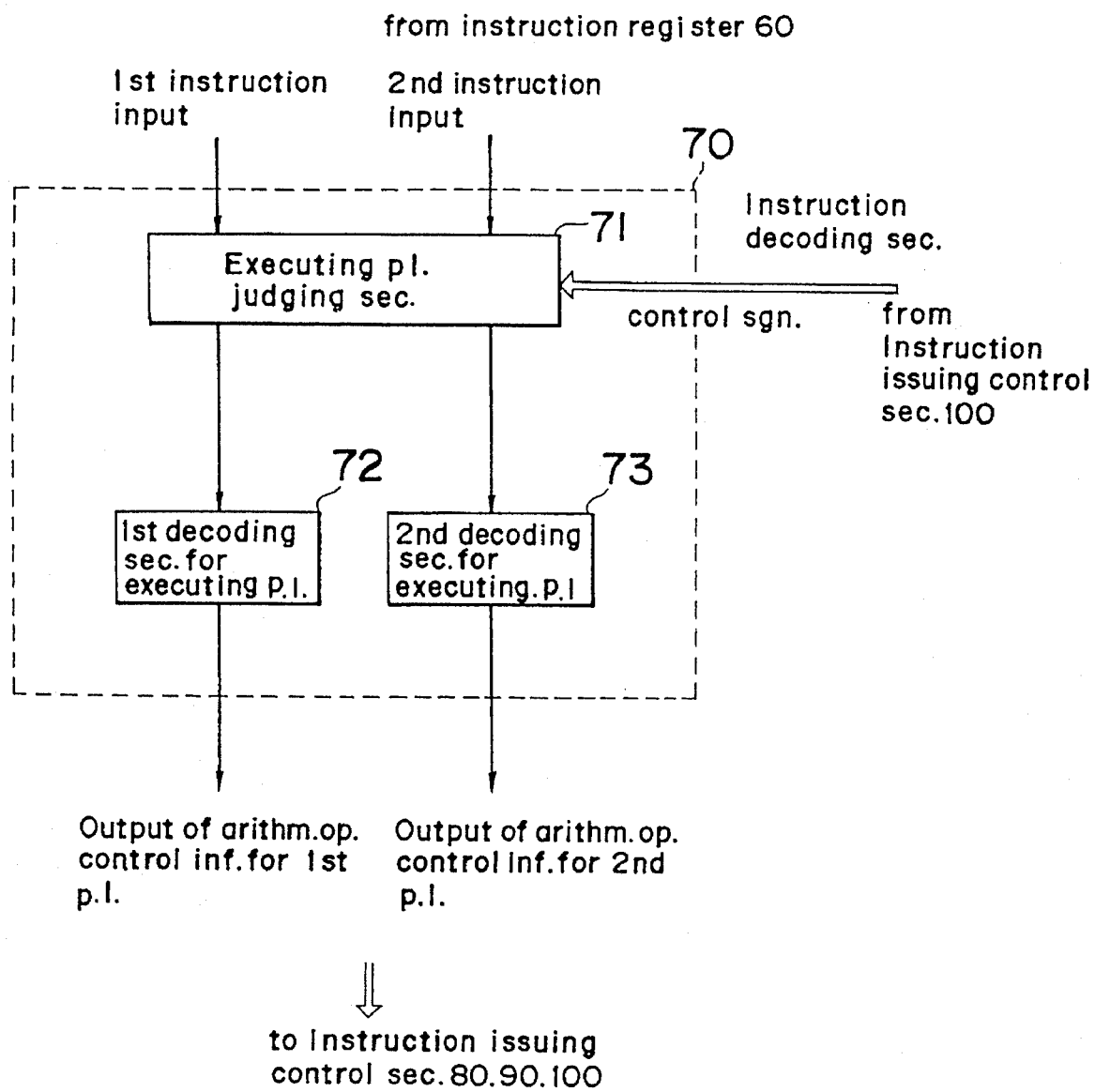
FIG. 5 is a block diagram of the instruction decoding section shown in FIGS. 1 and 2.

FIG. 5 is a block diagram of said instruction decoding part 70 which is comprised of a judging section 71 for selecting the pipeline to be executed in response to a control signal sent from the instruction issuing control part 100 and first and second decoding sections 72 and 73 for decoding instructions selectively sent from the judging section 71 to output operation control information to the first and second pipelines 10 (80) and 20 (90), respectively.

Figure 6:
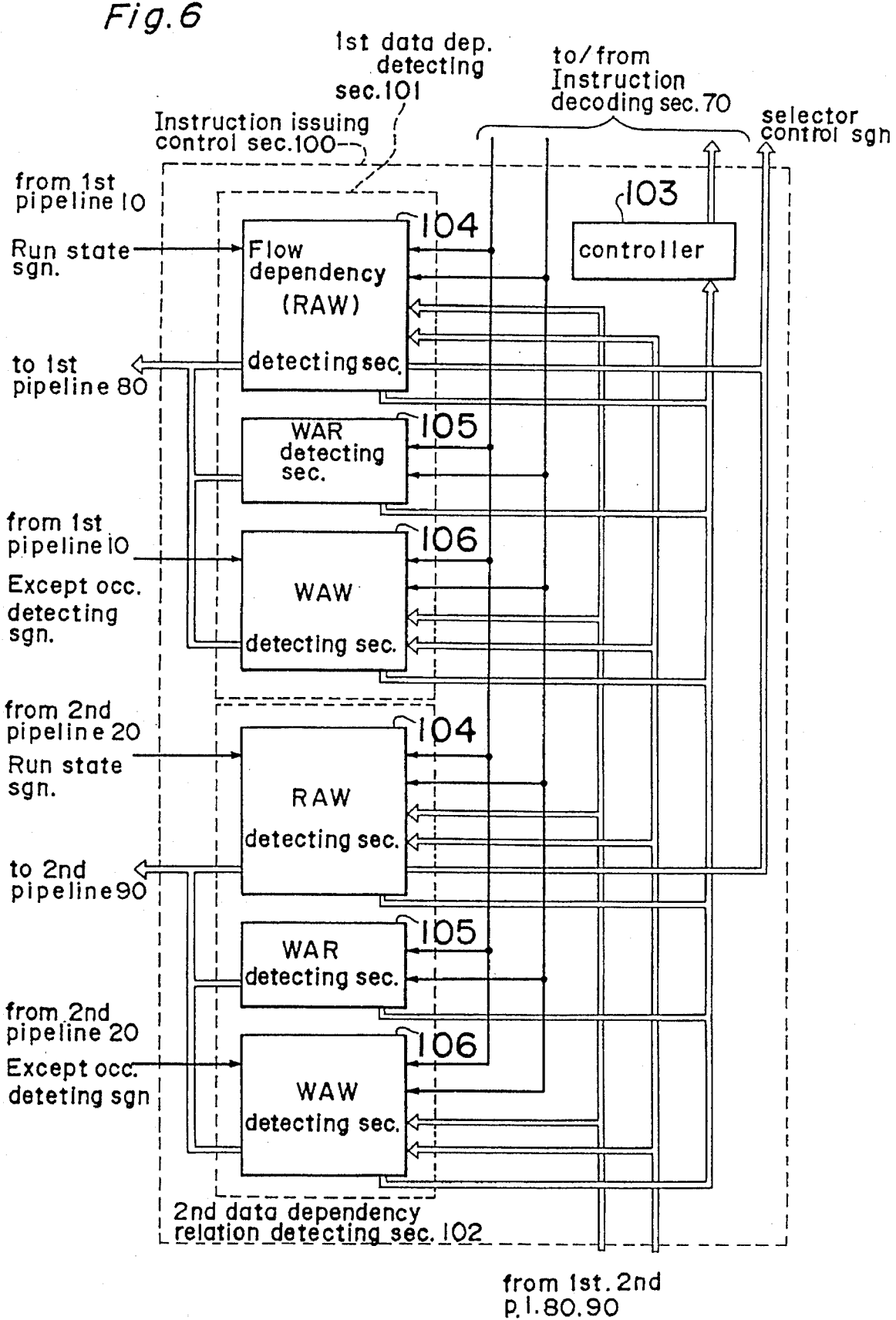
FIG. 6 is a functional diagram of the instruction issuing control section shown in FIGS. 1 and 2.

FIG. 6 is a block diagram of said instruction issuing control part 100. It includes first and second data dependency detecting sections 101 and 102 respectively corresponding to the 10 first and second-pipelines 10 (80) and 20 (90). Each of the first and second data dependency detecting sections 101 and 102 is comprised of flow dependency (RAW; READ AFTER WRITE), inverse dependency (WAR; WRITE AFTER READ) and output dependency (WAW; WRITE AFTER WRITE) detecting sections 104, 105 and 106 which are controlled by a controller 103.

Each detecting section 104, 105 or 106 receives the control information sent from the instruction decoding section 70 and a run state signal from the operation pipeline in order to detect if there is a data dependency between two instructions to be processed. For example, the RAW detecting section 104 checks the names of registers contained in two successive strings of instructions and, if the same register name is contained in both instructions in a manner as indicated by, for example, fmul fr00 fr01 fr02; fadd fr03 fr00 fr04, it decides that these two instruction have a flow dependency therebetween and outputs a RAW tag to the first or second pipeline 80 or 90. The other two detecting section 105 and 106 respectively decide WAR and WAW dependencies in a manner similar to that of RAW detecting section 104.

Figure 7:
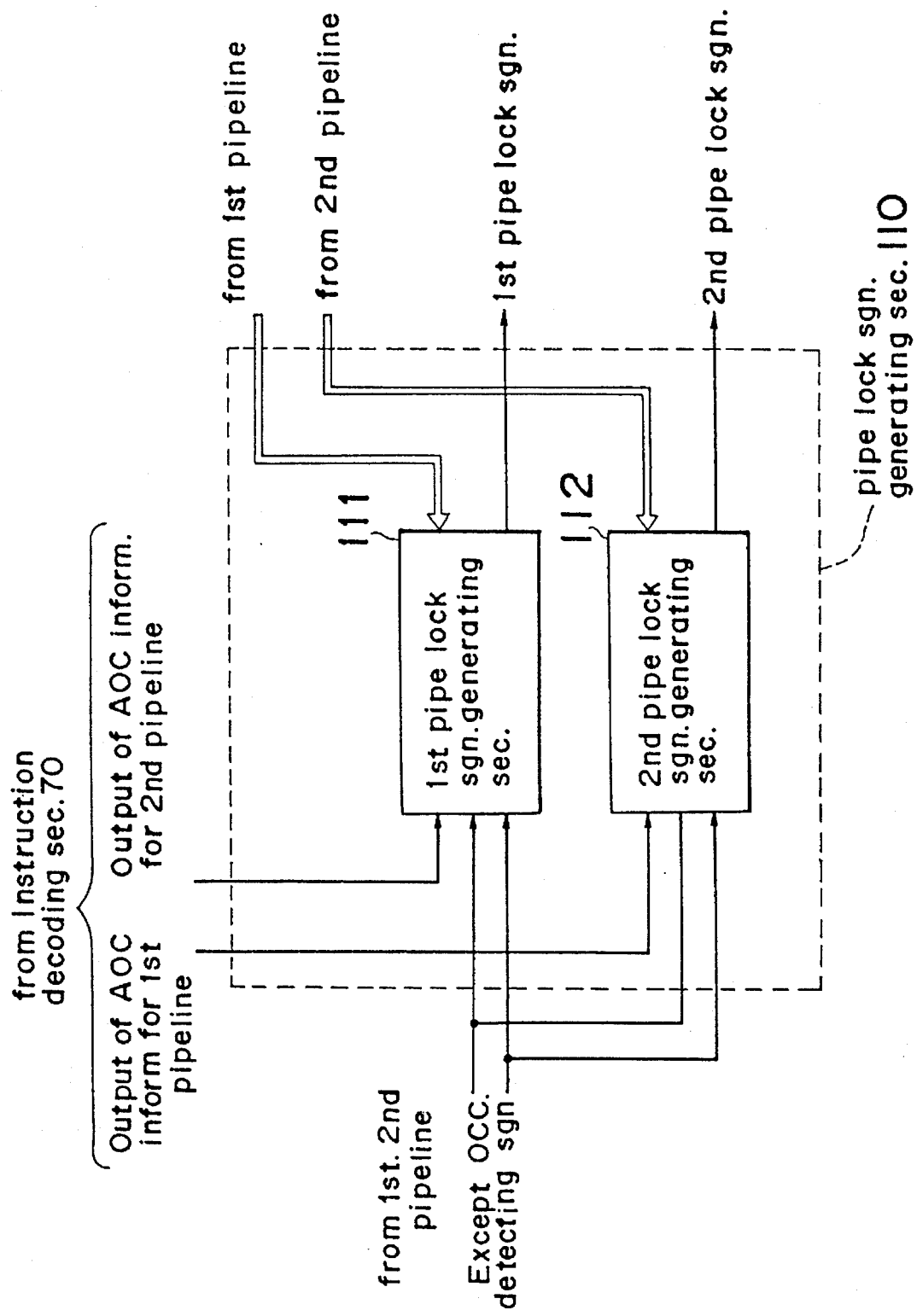
FIG. 7 is a functional diagram of the pipe lock signal generating section shown in FIGS. 1 and 2.

FIG. 7 is a block diagram of the pipe lock signal detecting section 110 mentioned above.

The processor of the present invention is constituted of the instruction processing part 50 and processing controlling part 120 as thus described hereinabove.

Figure 2:
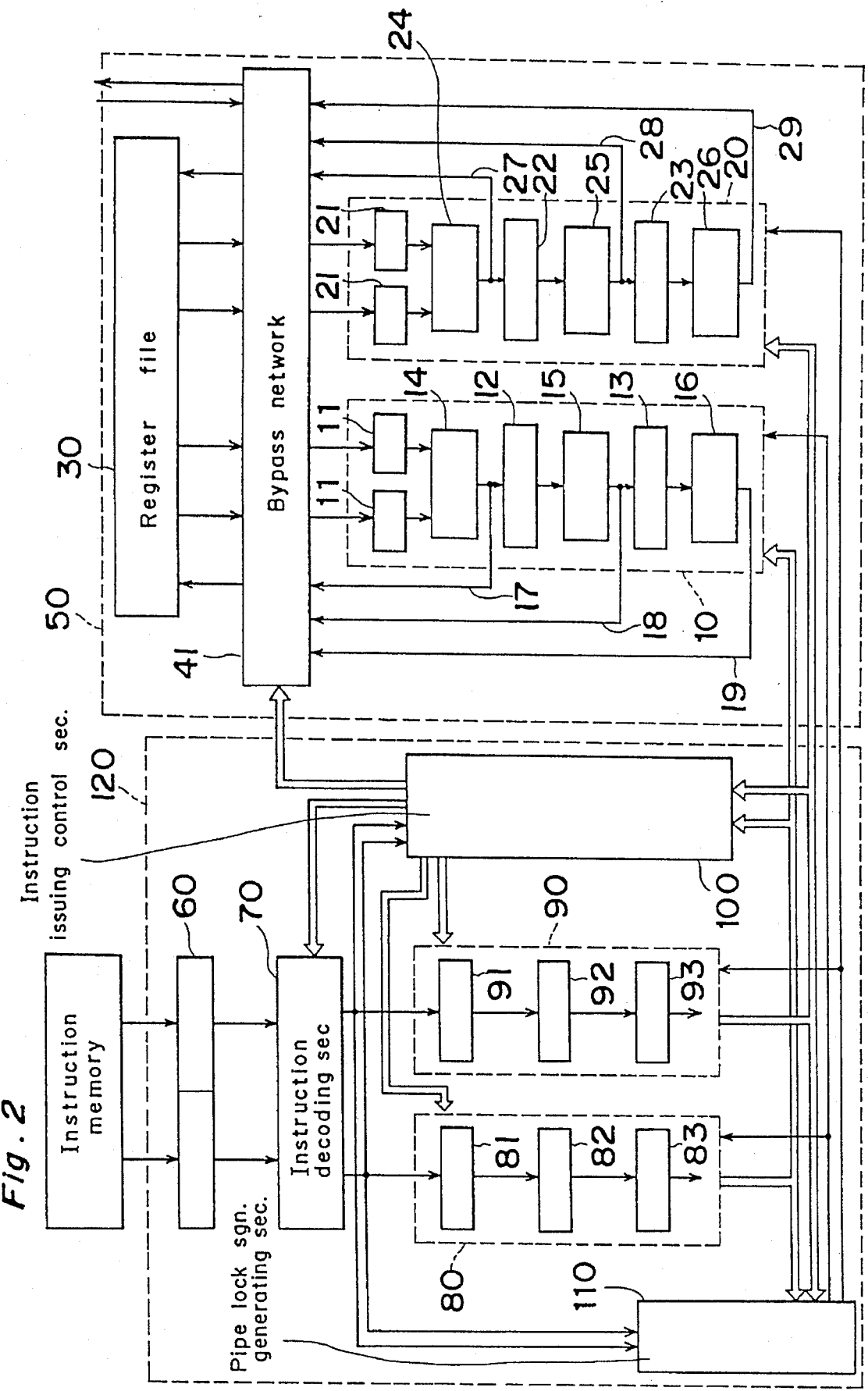
FIG. 2 is a block diagram of a second processor according to a second preferred embodiment of the present invention.

FIG. 2 is a structural block diagram of a second processor according to the preferred embodiment of the present invention.

Numerals 10 and 20 in FIG. 2 indicate a first and a second operational pipelines, respectively. For simplifying the description hereinafter, the second processor is assumed to have two operational pipelines 10 and 20, and each of the first and second operational pipelines 10 and 20 is assumed to have three stages of processing pipelines. The operational pipelines 10 and 20 are respectively comprised of a pair of input data registers 11 and 21 for latching and supplying an input data to first stage of the processing pipeline, a first and second pipeline registers 12 and, 13 and 22 and, 23 for latching the data from the previous stage and for supplying the data to second and third stages of the processing pipelines, and pipeline operating parts 14–16 and 24–26 for performing an operation for each stage of the pipeline. The operational pipelines 10 and 20 have first through third data output ports 17–19 and 27–29 to respectively output the operating result in each stage of the pipeline from the operating parts 14 and 24. A register file 30 has 2*2=4 read ports and 2 write ports. A bypass network 41 outputs data to the two write ports of the register file 30, input data registers 11 and 21 of the first and second operational pipelines 10 and 20 and a data memory when the data outputs from the first-third data output ports 17–19 and 27–29 of the first and second operational pipelines 10 and 20, from the data memory and from the four read ports of the register file 30 are input thereto. An instruction processing part 50 of the processor is formed in the aforementioned structure.

In the meantime, a processing controlling part 120 is constituted in a manner as will be depicted below. An instruction register 60 for fetching an instruction from an instruction memory is assumed to store two instructions at the most for brevity of the description. The instruction stored in the instruction register 60 is read and the corresponding operation controlling information is output from an instruction decoding part 70. The operation controlling information includes, for example, information to instruct an operation itself such as an adding operation or a multiplying operation, and information to fulfill an instruction such as the name of a register storing the input data or the name of a register to which the data is to be written, etc. A first operation controlling pipeline 80, upon receipt of an input of the operation controlling information from the instruction decoding part 70, transmits the operation controlling information to each stage of the processing pipeline of the first operational pipeline 10. The first operation controlling pipeline 80 has three stages of controlling registers 81, 82 and 83 to control the three stages of the processing pipelines. Each stage of the controlling register stores the operation controlling information for the corresponding stage of the processing pipeline of the first operational pipeline 10. On the other hand, a second operation controlling pipeline 90 with three stages of controlling registers 91 transmits the operation controlling information to each stage of the processing pipeline of the second operational pipeline 20 when receiving an input of the operation controlling information from the instruction analyzing part 70. The operation controlling information to control each stage of the pipeline of the second operational pipeline 20 is stored in the corresponding stage of the controlling register 91, 92 and 93. An instruction issuance controlling part 100 outputs a bypass controlling signal to control the bypass network 41 when having the operation controlling information output from the first and second operation controlling pipelines 80 and 90, and the operation controlling information from the instruction decoding part 70. At the same time, the instruction issuance controlling part 100 outputs a controlling signal to each of the instruction analyzing part 70, first operation controlling pipeline 80 and second operation controlling pipeline 90, so as to thereby control the issuance of the instruction. A pipeline locking signal generating part 110 decides whether it is permitted to proceed to the next stage of the pipeline in each of the first and second operational pipelines 10 and 20 when it receives an input of the operation controlling information from the first and second operation controlling pipelines 80 and 90 and the operation controlling information from the instruction decoding part 70. If it is not permitted, the locking signal generating part 110 generates a first or a second pipeline locking signal to restrict the advancement to the stage of the next first operational pipeline 10 and first operation controlling pipeline 80, or of the second operational pipeline 20 and second operation controlling pipeline 90. The processor of the present embodiment consists of the instruction processing part 50 and processing controlling part 120 as is described above.

Now, the operation of the processor will be described with reference to a conceptual diagram of the pipelines shown in FIGS. 8(a)–8(b). Since the first and second processors of FIGS. 1 and 2 are driven fundamentally in the same fashion except for the fact that an output from the first and second stages of the processing pipelines can be bypassed as an input operand in the second processor, the common points in the operation will not be distinguished between the first and second processors in the following description.

Figure 8A:
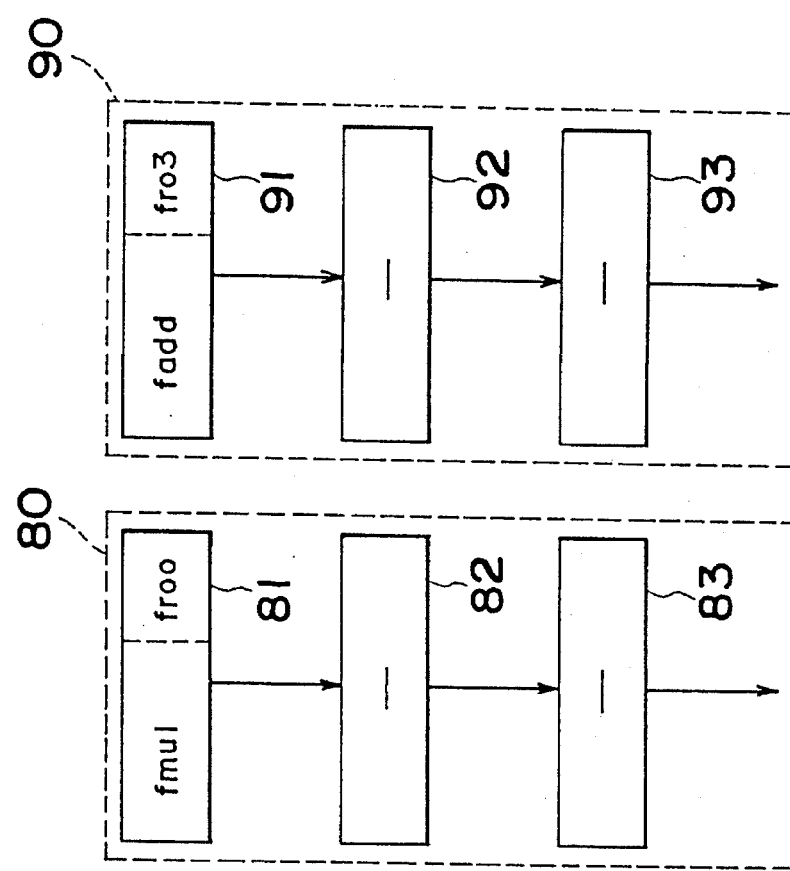
FIGS. 8(a) and 8(b) respectively show the states of the first and second processing control pipelines when instructions without any dependency are fetched in the instruction register and when two instructions are issued from the instruction issuing section.
Figure 8B:
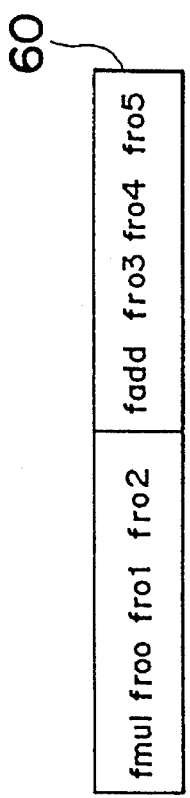
Figure 8B:
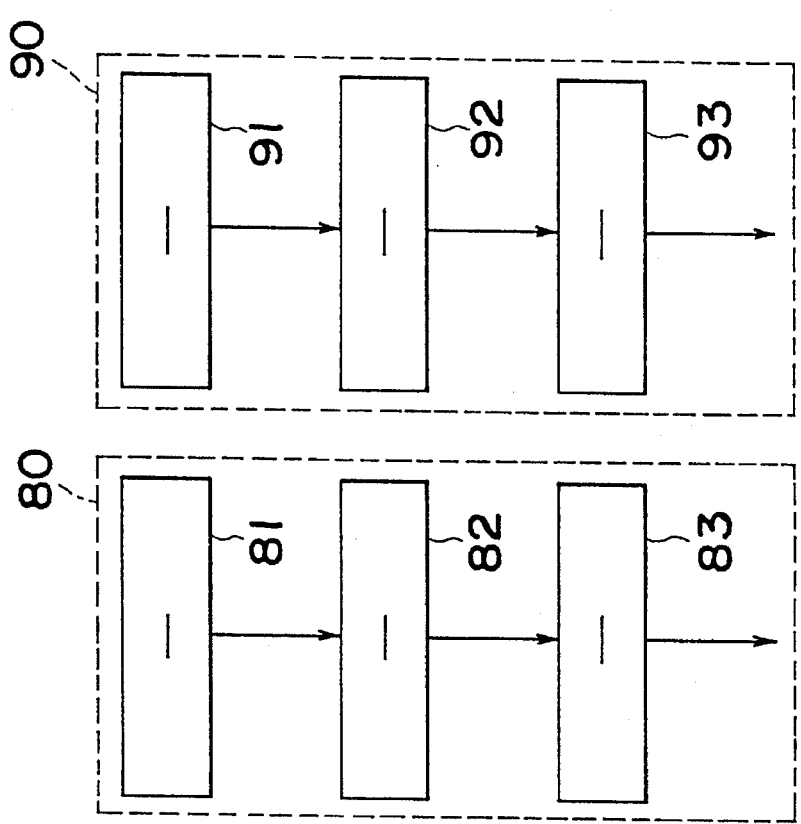

FIG. 8(a) shows the state when two strings of instructions, i.e., fmul fr00 fr01 fr02 fadd fr03 fr04 fr05 are fetched from the instruction memory. No dependency is present between the two instructions. For the convenience of description, it is assumed that the instructions already issued have been completely processed, and no effective data is present in the first and second operational pipelines 10 and 20, and moreover, no effective operation controlling information is present in the first and second operation controlling pipelines 80 and 90.

In the state as above, the two instructions stored in the instruction register 60 are promptly analyzed by the instruction decoding part 70 which then outputs the operation controlling information related to the two instructions. An input data required for these instructions is read from the register file 30 and is output to the input data registers 11 and 21 of the first and second operational pipelines 10 and 20 via the bypass network 40. When the instructions are accompanied by the necessary input data, the operation controlling information is written into the controlling registers 81 and 91, while the input data is written into the input data registers 11 and 21, thus completing the issuance of the instructions. FIG. 8(b) shows the state of the operation controlling pipelines 80 and 90 when the issuance of the two instructions is completed. The operation controlling information of the issued instructions are stored in the corresponding controlling registers 81 and 91. Naturally, the effective data is stored in the input data registers 11 and 21 of the corresponding operational pipelines. Hereinafter, it is taken for granted that the effective data is always present in each of the operational pipelines 10 and 20 when the description is directed to the corresponding operation controlling pipelines 80 and 90, and therefore the description of the effective data will be abbreviated. The issued instructions are processed through a pipeline procedure and finally written into the register file 30 via the bypass network 40. Accordingly, the execution of the instructions is completed. The control as above is effected by the instruction issuance controlling part 100 and pipeline locking signal generating part 110. The control as will be described below is also performed in the same manner.

Figure 9A:
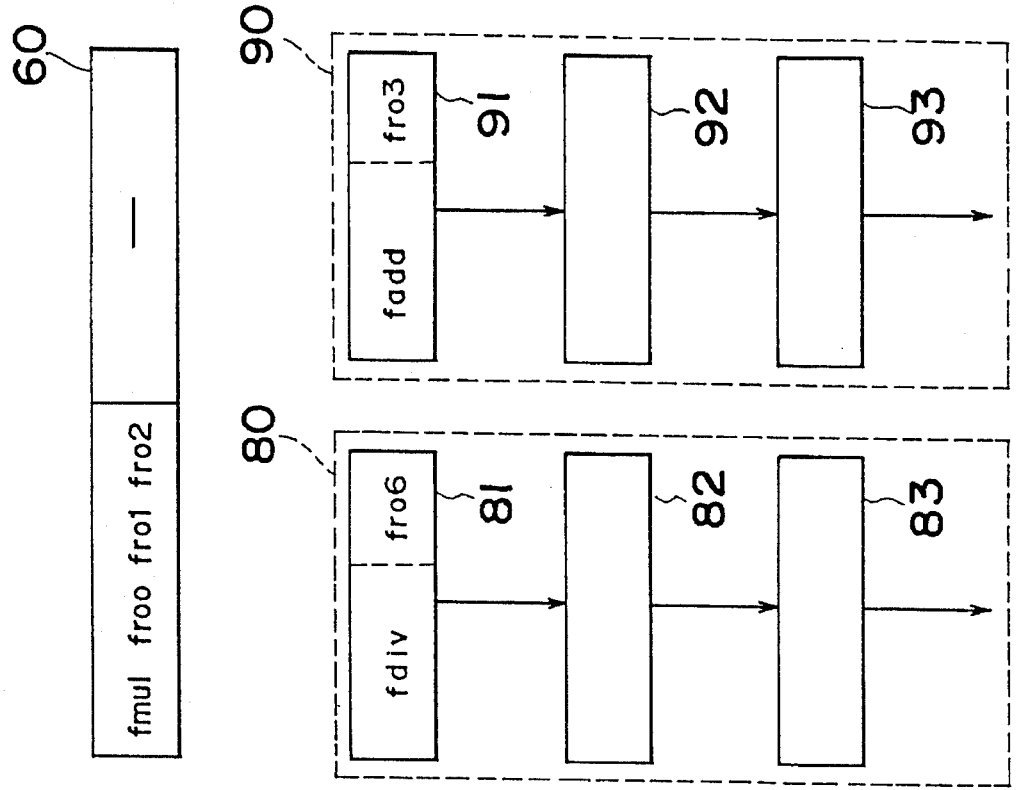
FIGS. 9(a), 9(b) and 9(c) are explanatory diagrams for respectively showing the progressing states of the processing control pipelines when an instruction for preventing the progress of the pipelines is registered in the first stage of the first pipeline.
Figure 9B:
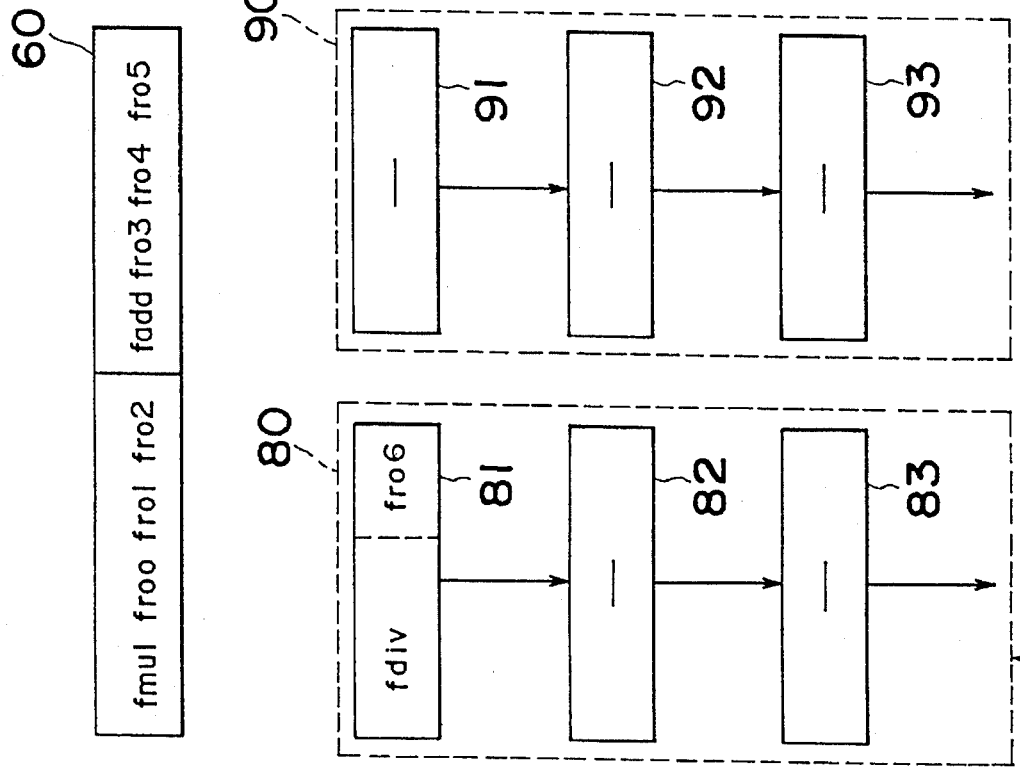
Figure 9C:
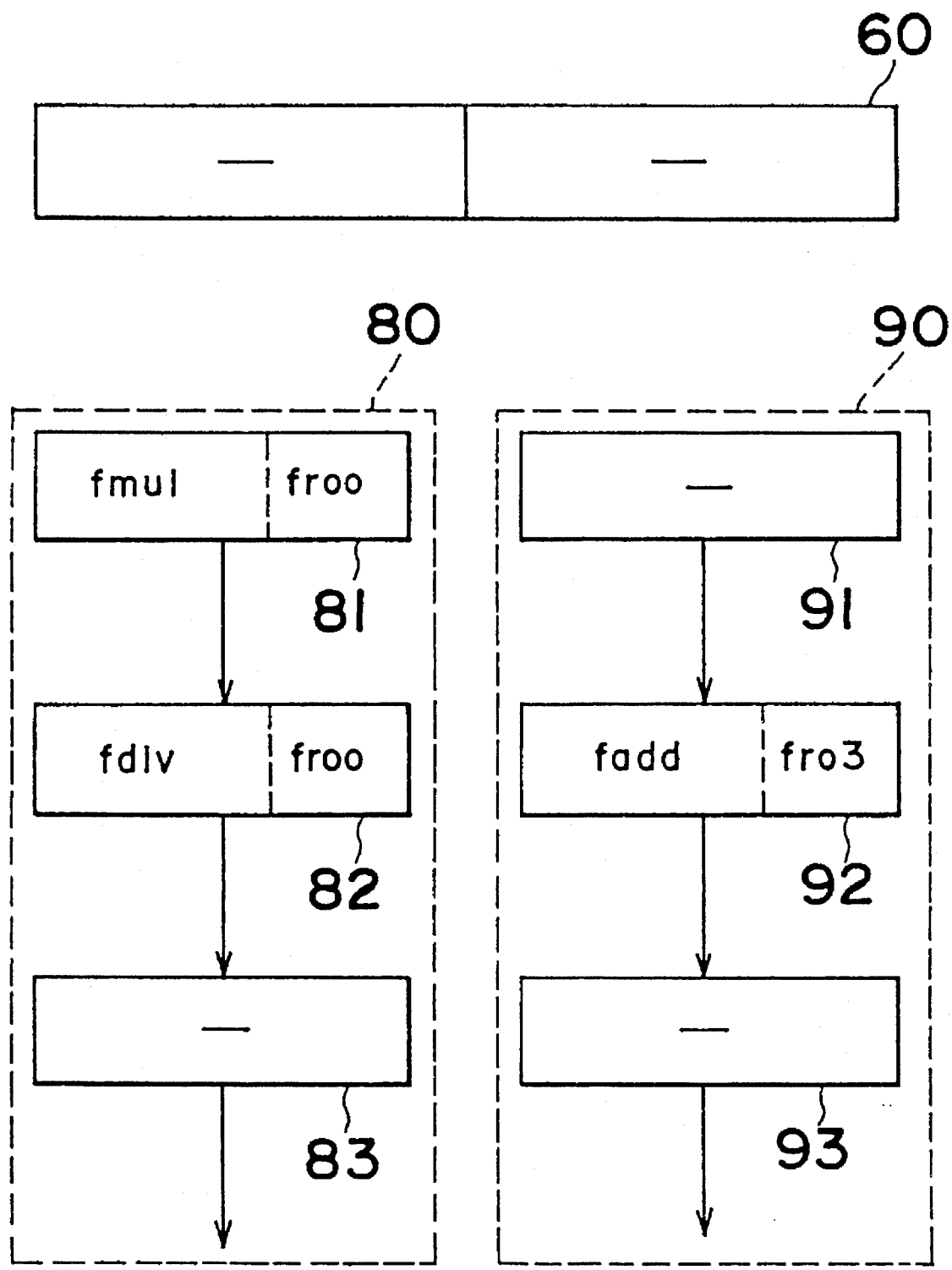

FIG. 9(a) illustrates the state where an instruction to hinder the advancement of the pipeline (for example, a floating-point dividing instruction fdiv) is stored in the first stage of the first operation controlling pipeline 80, and the first operation controlling pipeline 80 is prohibited from advancing by a first pipeline locking signal. Moreover, two strings of instructions, that is, fmul fr00 fr01 fr02
fadd fr03 fr04 fr05 are stored in the instruction register 60, without any dependency therebetween and among the already-issued instructions. In this state, since the first pipeline locking signal is output to the first operation controlling pipeline 80, the instruction fmul cannot be issued to the first operation controlling pipeline 80, but the instruction fadd can be issued to the second operation controlling pipeline 90. In FIG. 9(b), only the instruction fadd is issued and the instruction fmul is inhibited from being issued. However, the instruction fmul having no dependency is made issuable when the first pipeline locking signal is released. FIG. 9(c) shows when the first pipeline locking signal is released, so that the instruction fmul is issued. In this manner of control as described above, it becomes possible to issue the instructions from an issuable instruction, not in the fetching order.

Figure 10B:
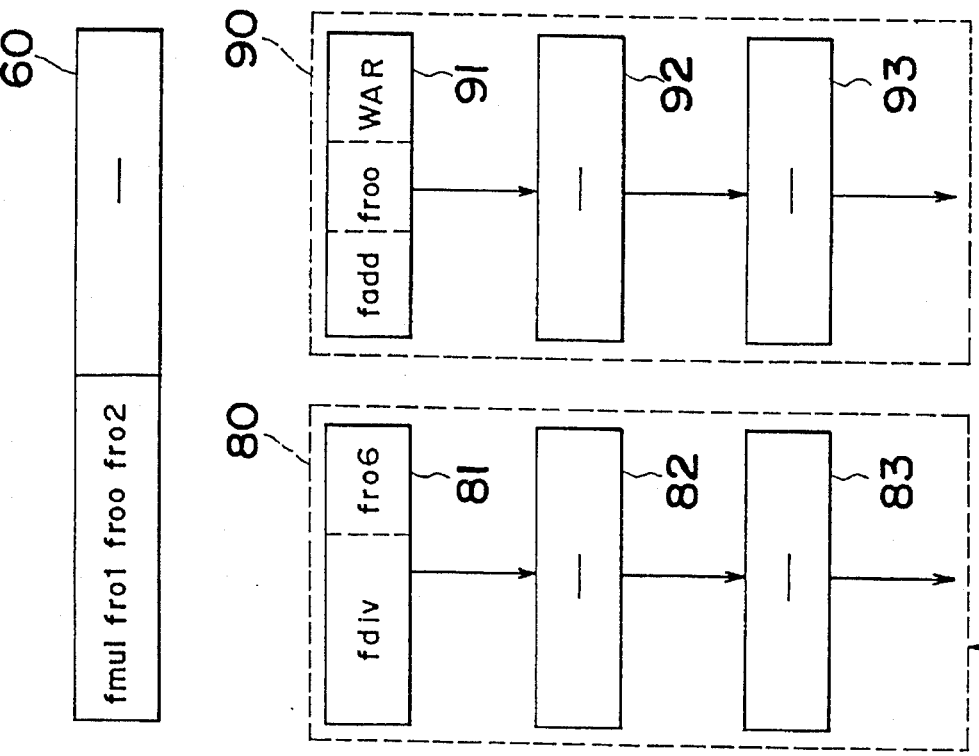
FIGS. 10(a), 10(b), 10(c) and 10(d) are explanatory diagrams for respectively showing the progressing states of the processing control pipelines when an instruction for preventing the progress of the pipelines is registered in the first stage of the first pipeline locked by a first pipe lock signal and instructions having an inverse dependency therebetween are stored in the instruction register.
Figure 10A:
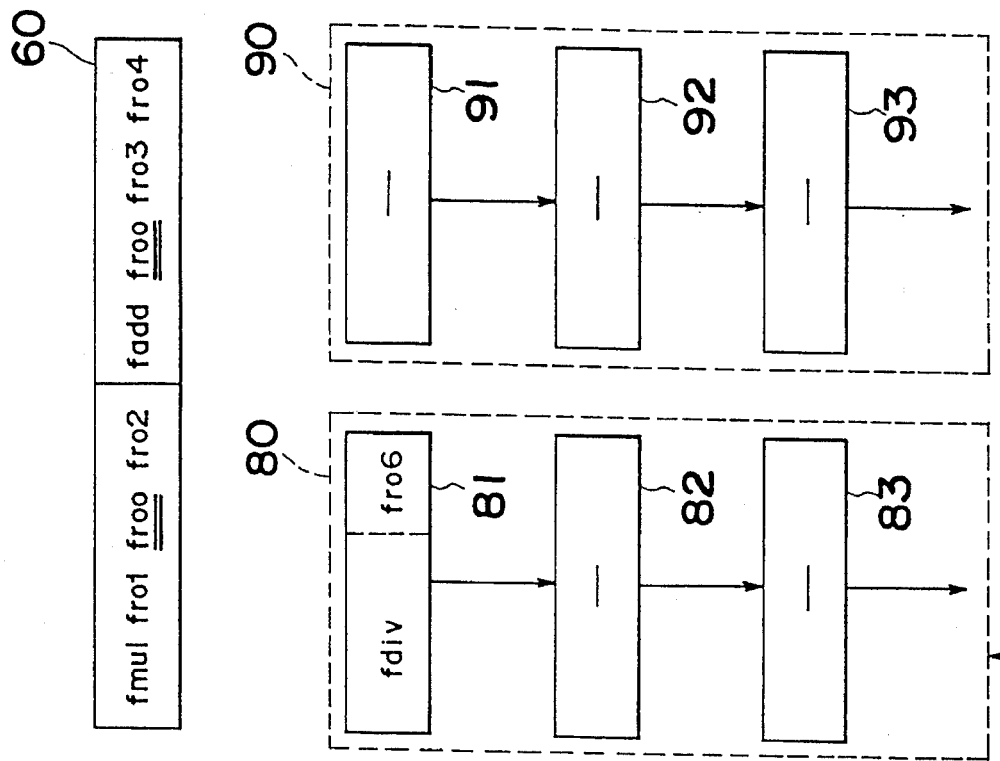

In the state shown in FIG. 10(a), an instruction to hinder the advancement of the pipeline (e.g., a floating-point dividing instruction fdiv) is stored in the first stage of the first operation controlling pipeline 80, and the first operation controlling pipeline 80 is prohibited by a first pipeline locking signal from advancing, with two strings of instructions stored in the instruction register 60 as follows:

fmul fr01 fr00 fr02
fadd fro0 fr03 fr04.

Figure 10D:
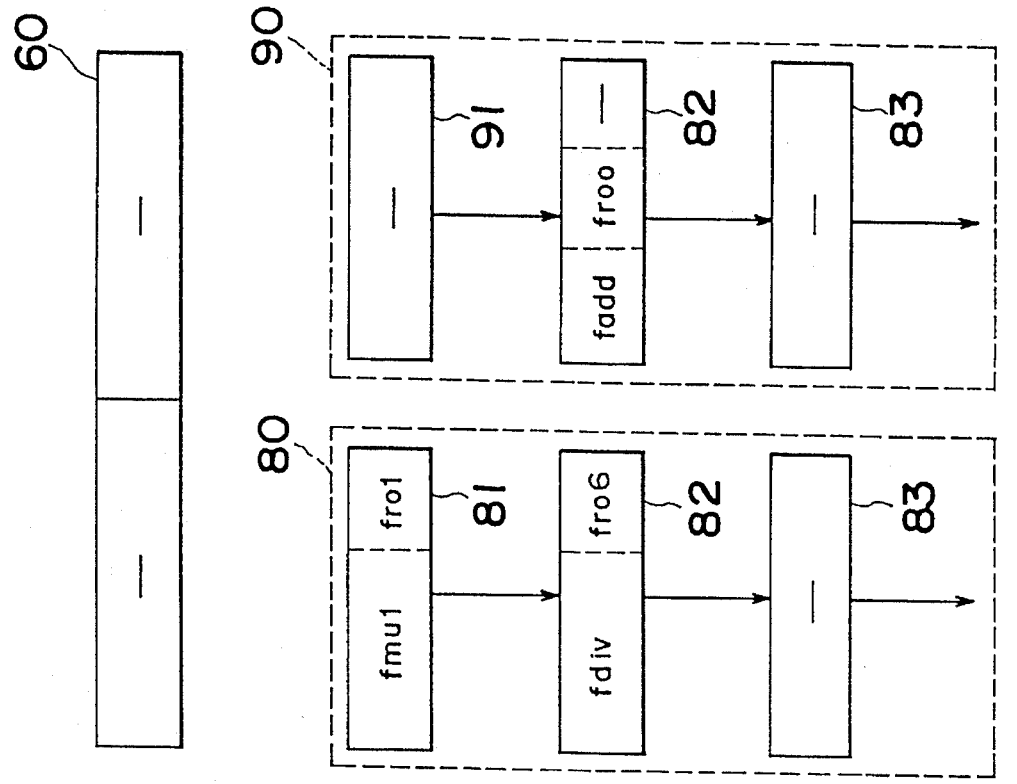
Figure 10C:
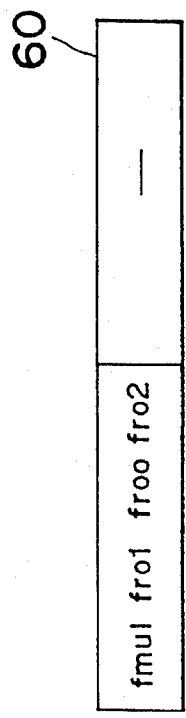
Figure 10C:
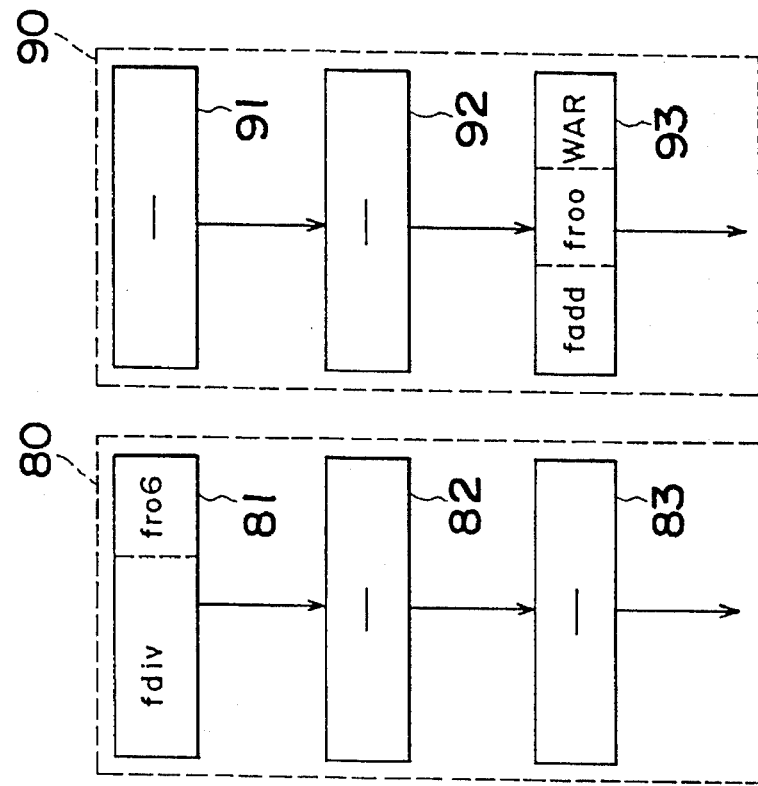

The inverse dependency is present between the two instructions regarding the register fr00. In other words, the succeeding instruction, namely, instruction fadd, is prohibited from writing the data to the register fr00 before the preceding instruction, that is, instruction fmul, finishes the reading of data from the register fr00. However, the processor of the present invention can issue even the succeeding instruction with the inverse dependency. FIG. 10(b) indicates the state where the succeeding instruction fadd is issued. More specifically, an identifier or a tag (WAR: Write After Read) is added to the operation controlling information for the succeeding instruction fadd to show that an instruction fadd has the inverse dependency. The instruction fadd is stored along with this identifier WAR in the controlling register 91 of the first stage of the second operation controlling pipeline 90. FIG. 10(c) shows the state when the' succeeding instruction fadd is advanced to the final stage of the second operation controlling pipeline 90 while the preceding instruction fmul is not issued. In the state shown in FIG. 10(c), a second pipeline locking signal is output to the second operation controlling pipeline 90, thereby restraining the advancement of the second operation controlling pipeline 90. The second pipeline locking signal is continued to be output until the preceding instruction fmul is issued, in other words, the instruction fadd is not written into the register fr00 until reading from the register fr00 has started. FIG. 10(d) shows the case where the preceding instruction fmul is issued before the succeeding instruction fadd reaches the final stage of the pipeline. In this case, the identifier WAR in the operation controlling information of the instruction fadd is reset and the instruction fadd is advanced to a next stage. Moreover, the reading of the preceding instruction fmul to the register fr00 is already finished when the instruction fmul is issued. Therefore, the first and second operation controlling pipelines 80 and 90 are never inhibited from proceeding, but are keep processing. Accordingly, the two instructions:can be parallel-processed while the inverse dependency is ensured.

Figure 15:
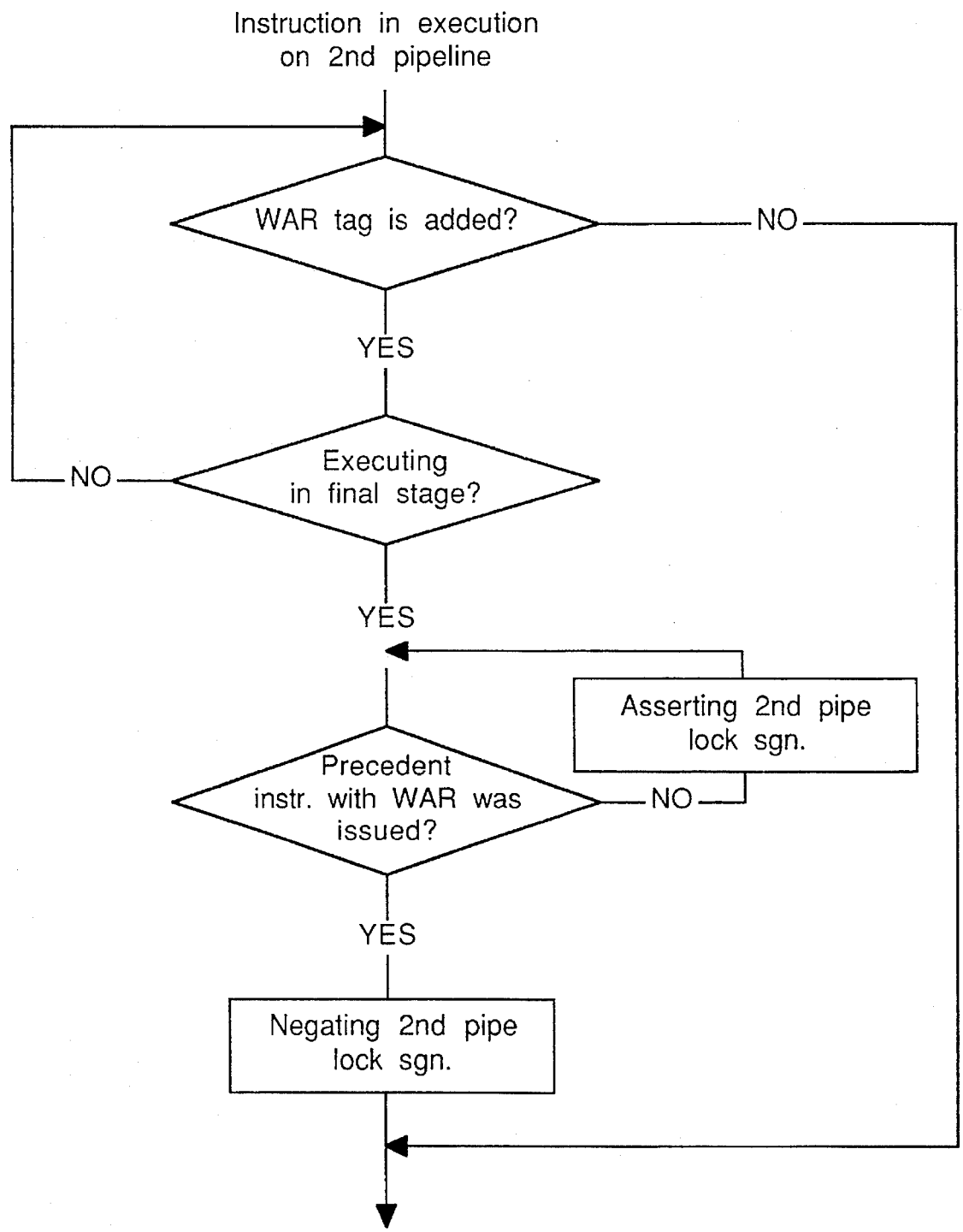
FIG. 15 is a flowchart for generating a second pipe lock signal to dissolve the inverse dependency shown in FIGS. 10(a) to 10(d)

FIG. 15 is a flowchart for generating a second pipe lock signal by the pipe lock signal generating part 110. At first, a determination is made as to whether or not the instruction now being executed in the second operational pipeline 20 has a WAR tag added thereto. If so, a determination is made as to whether or not the instruction is being processed in the final stage of pipeline. If so and the precedent instruction with a WAR tag has not yet been issued, a second pipe lock signal is asserted to lock the second pipeline 90. If the precedent instruction it has been issued already, the second pipe lock signal it is erased (negated) at the next step.

Figure 16:
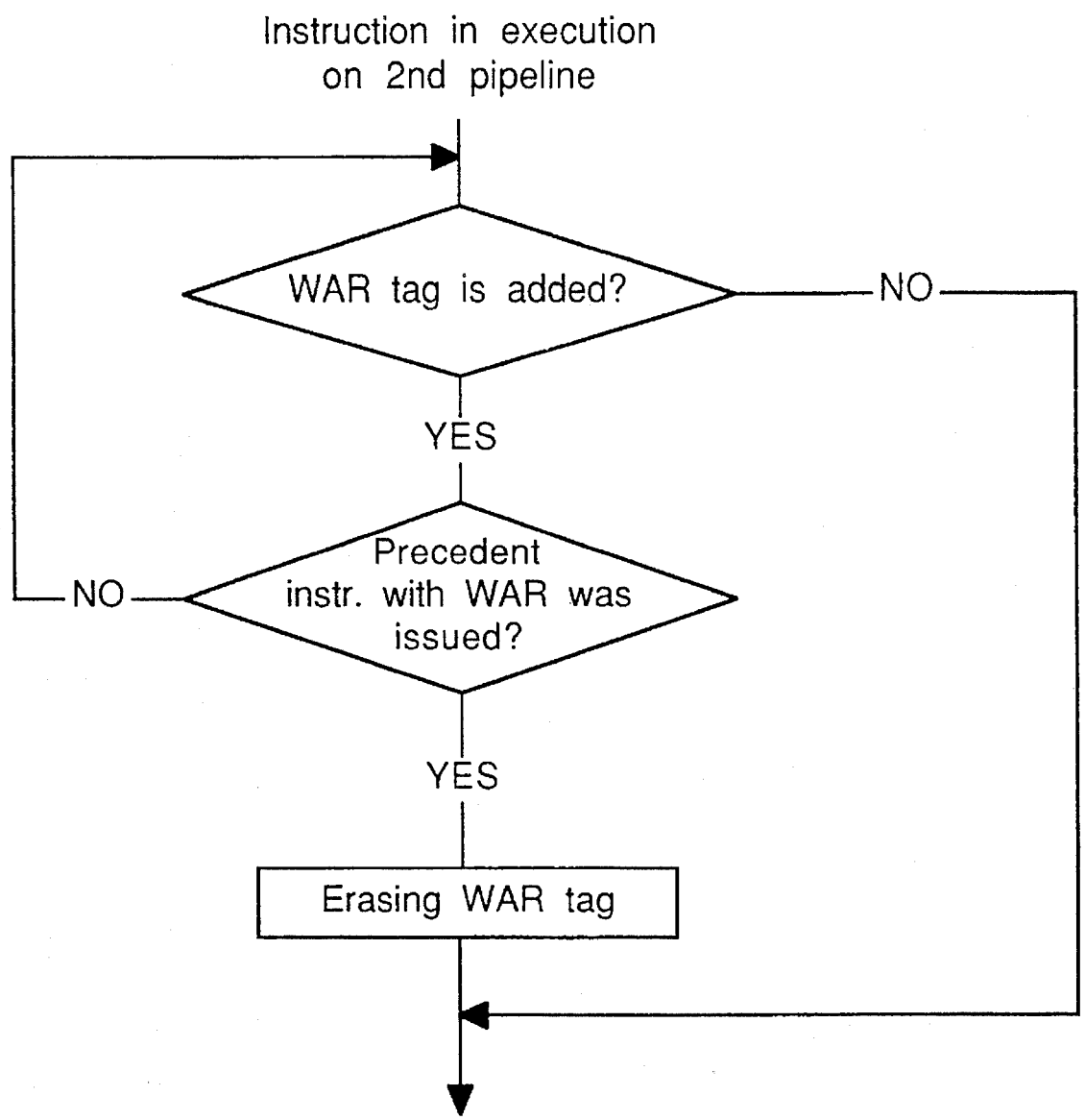
FIG. 16 is a flowchart for deleting a WAR tag to dissolve the inverse dependency shown in FIGS. 10(a) to 10(d)

FIG. 16 is a flowchart for erasing the WAR tag to eliminate the inverse dependency as shown in FIGS. 10(a)–10(d).

Figure 11A:
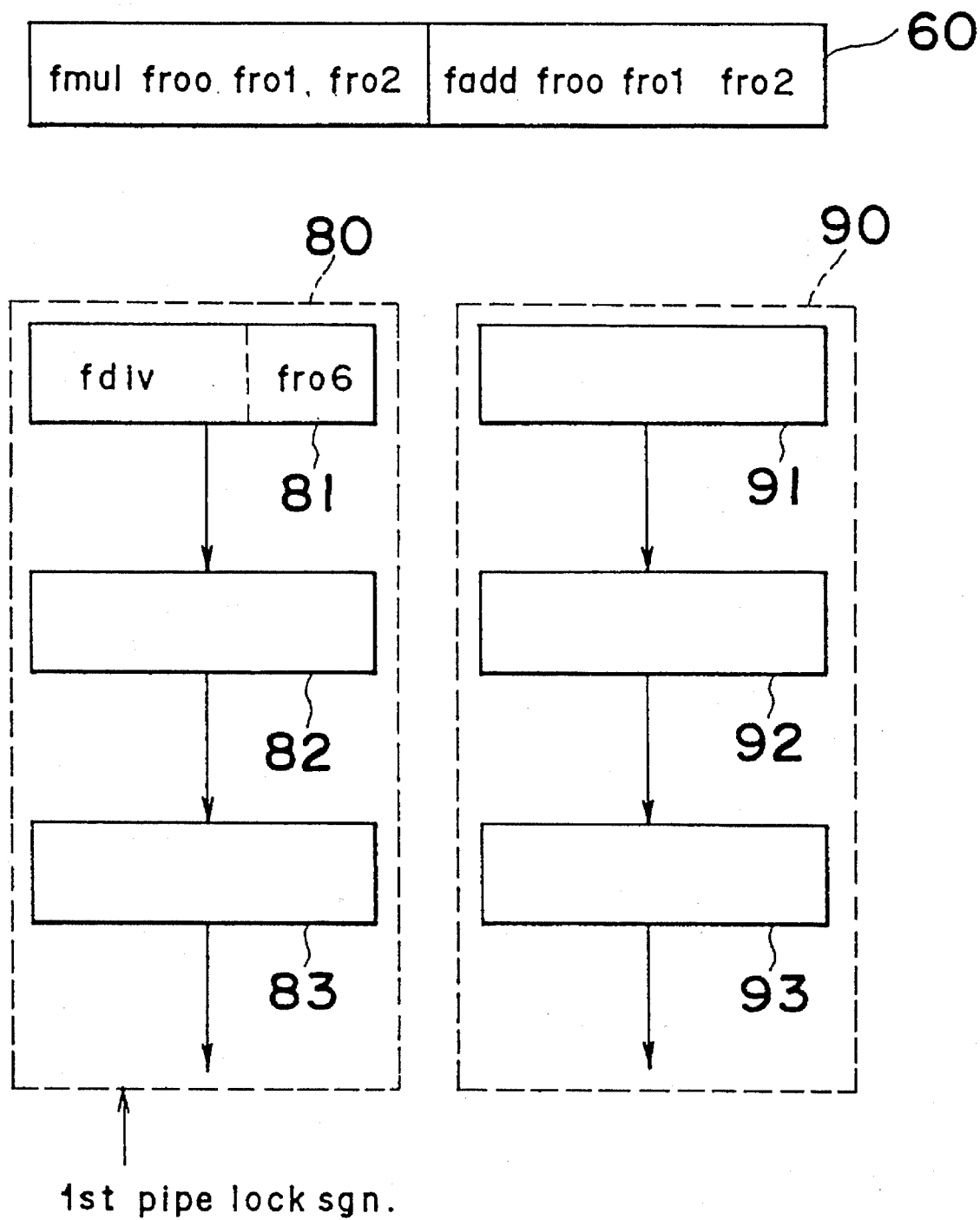
Figure 11C:
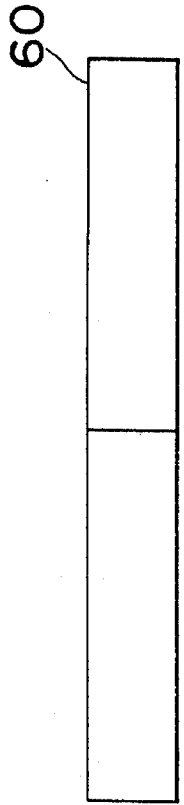
Figure 11B:
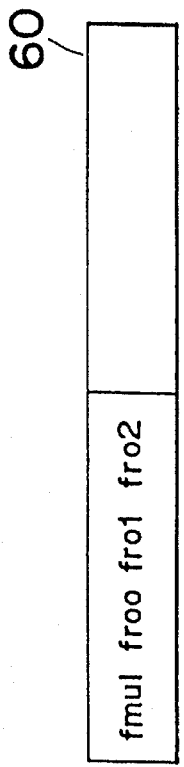
Figures 2, 11D:
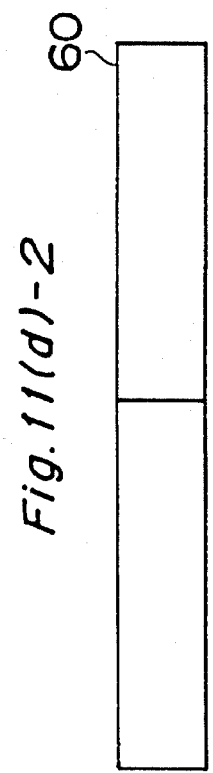
Figures 1, 11D:
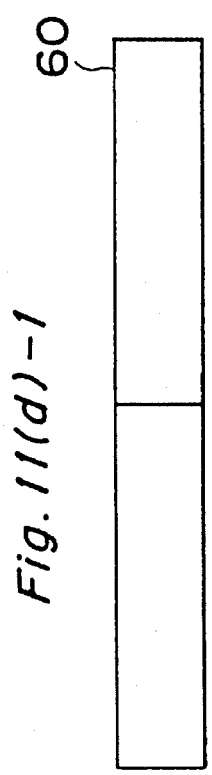
Figure 11E:
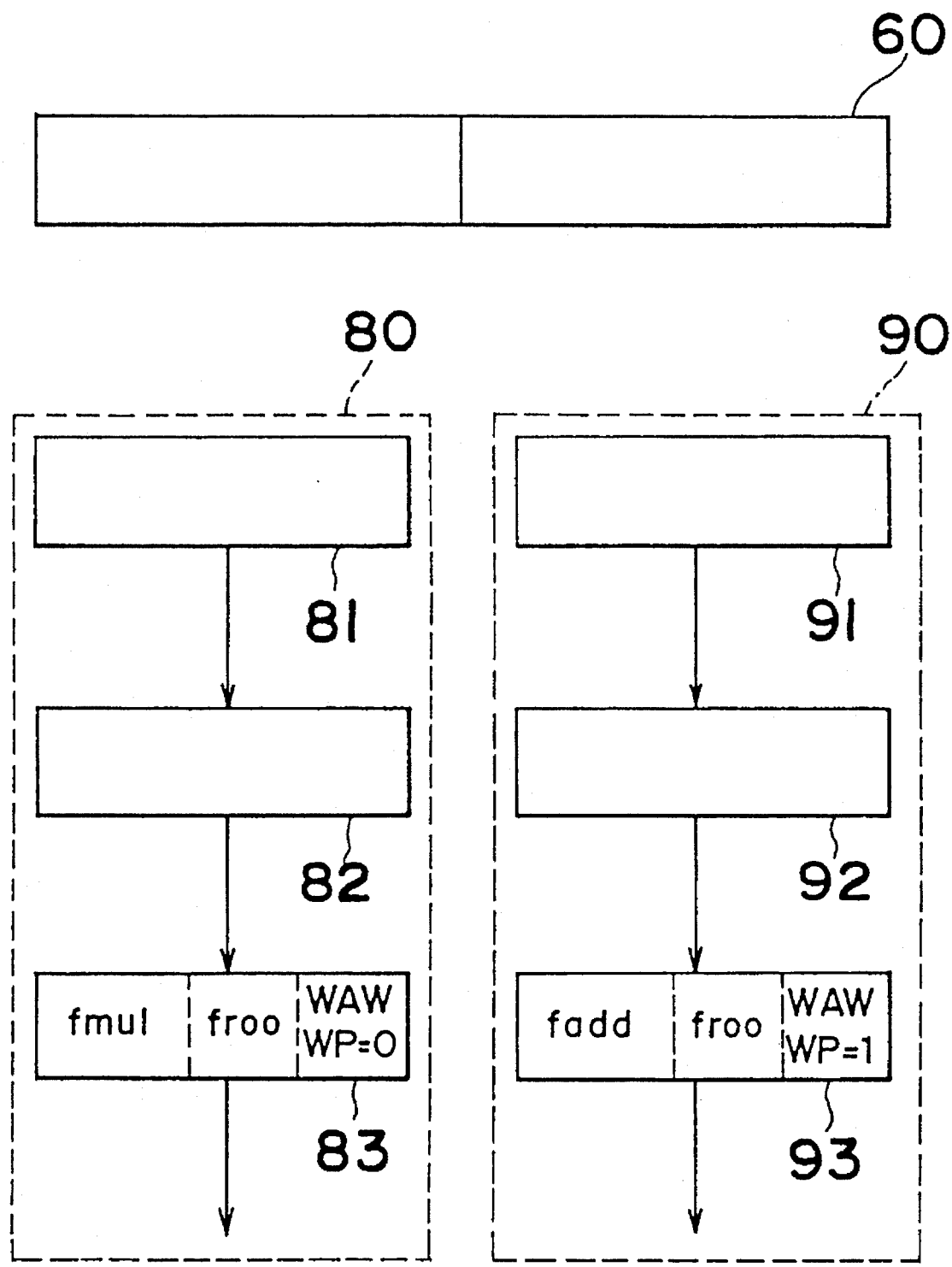

FIG. 11(a) is the case where an instruction to hinder the advancement of the pipeline (e.g., a floating-point dividing instruction fdiv) is stored in the first stage of the first operation controlling pipeline 80, and the advancement of the first operation controlling pipeline 80 is prohibited by a first pipeline locking signal. In the instruction register 60, two strings of instructions are stored, that is, fmul fr00 fr01 fr02 and fadd fr00 fr03 fr04 with an output dependency therebetween with respect to the register fr00. In other Words, the succeeding instruction fadd is not allowed to be written into in the register fr00 before the preceding instruction fmul completely finishes being written into the register fr00. FIG. 11(b) shows the state when the succeeding instruction fadd is issued. Even a succeeding instruction having an output dependency can be issued according to the processor of the present invention. The succeeding instruction fadd has an identifier indicating an presence of the output dependency (WAW: Write After Write) added to the operation controlling information. The controlling register 91 in the first stage of the second operation controlling pipeline 90 stores the instruction including the identifier WAW. Moreover, the writing priority (WP: Write Priority) is set to be a higher value "1" in accordance with the order of the instruction strings, which is also stored in the controlling register 91. In FIG. 11(c), the preceding instruction fmul is issued at a next cycle. The identifier WAW is set and the writing priority WP is set to a lower value "0" in the operation controlling information of the instruction fmul. In the state of FIG. 11(d)-1, the preceding instruction fmul is processed in the first stage of the operational pipeline 10, so as to thereby detect that there is no possibility of generation of an exceptional process, and consequently the identifier WAW is reset and an identifier to inhibit writing (WD: Write Disable) set. Then, the pipeline is progresses to a next stage. Although there is a succeeding instruction fadd in the final stage of the second operation controlling pipeline 90, no instruction having the same identifier WAW as the succeeding instruction fadd exists in the other operation controlling pipelines, and therefore the second operational pipeline 20 is never prohibited from advancing. The preceding instruction fmul is not written into the register because of the identifier WD, thus assuring the output dependency. FIG. 11(d)-2 shows a case where the preceding instruction having the same identifier WAW as a succeeding instruction fadd is in the first operation controlling pipeline 80 when the instruction fadd is advanced to the last stage of the second operation controlling pipeline 90. In this case of FIG. 11(d)-2, a second pipeline locking signal is output to the second operation controlling pipeline 90, whereby the second operation controlling pipeline 90 is prohibited from advancing until the preceding instruction proceeds to the final stage. FIG. 11(e) shows when both the preceding and succeeding instructions of the output dependency are advanced to the last stage of the pipelines. If an exceptional process is done for the preceding instruction, the operation result of the preceding instruction is written into the register to preserve the fact. In cases other than the above, the identifiers WP are compared with each other and the data of a higher WP is written into the register. Accordingly, while the output dependency is maintained, the instructions can be parallel-processed.

Figure 17:
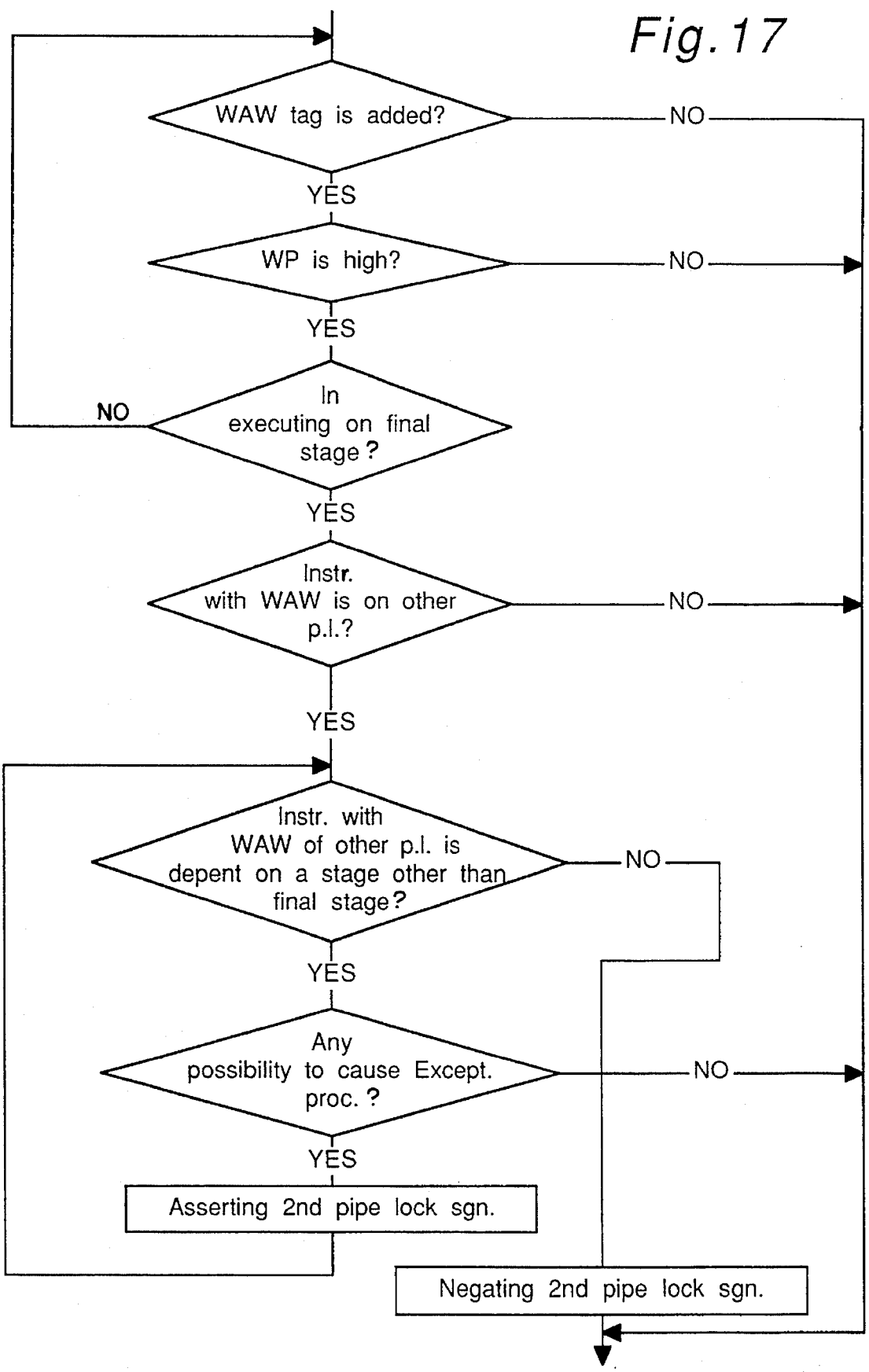
FIG. 17 is a flowchart for generating a second pipe lock signal to dissolve the inverse dependency shown in FIGS. 11(a) to 11(e)

FIG. 17 is a flowchart for generating a second pipe lock signal to eliminate the output dependency shown in FIGS. 11(a)–11(e).

As shown therein, if a WAW tag is added to in the instruction being executed in the second operational pipeline, it is checked whether the identifier WP (Write Priority) is high. If it is high and the instruction is being executed in the final stage, a determination is made as to whether or not an instruction with a WAW tag is present in the other pipeline. If a WAW tag is present and it is located in a stage other than the final stage of the other pipeline, a determination is made as to whether or not there is any possibility to demand any exceptional processing. If it is so, a second pipe lock signal is generated to lock the second pipeline.. Thereafter, if the instruction with a WAW goes to the final stage of the other pipeline, the second pipe lock signal is erased (negated).

Figure 18:
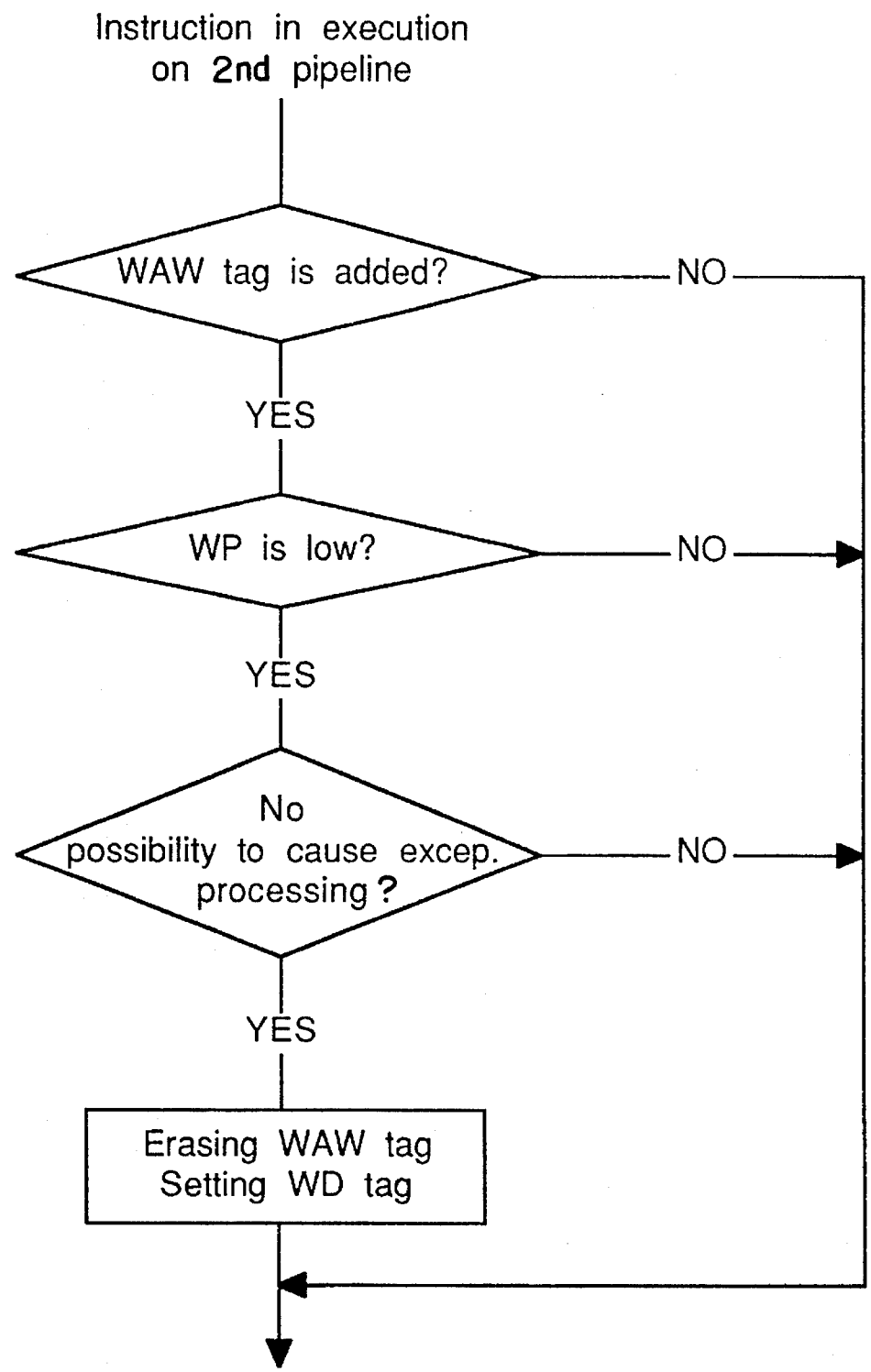
FIG. 18 is a flowchart for tag-processing to dissolve the inverse dependency shown in FIGS. 11(a) to 11(e)

FIG. 18 is a flowchart for processing WAW and WD tags to eliminate the output dependency as shown in FIGS. 11(a)–11(e).

Figure 12A:
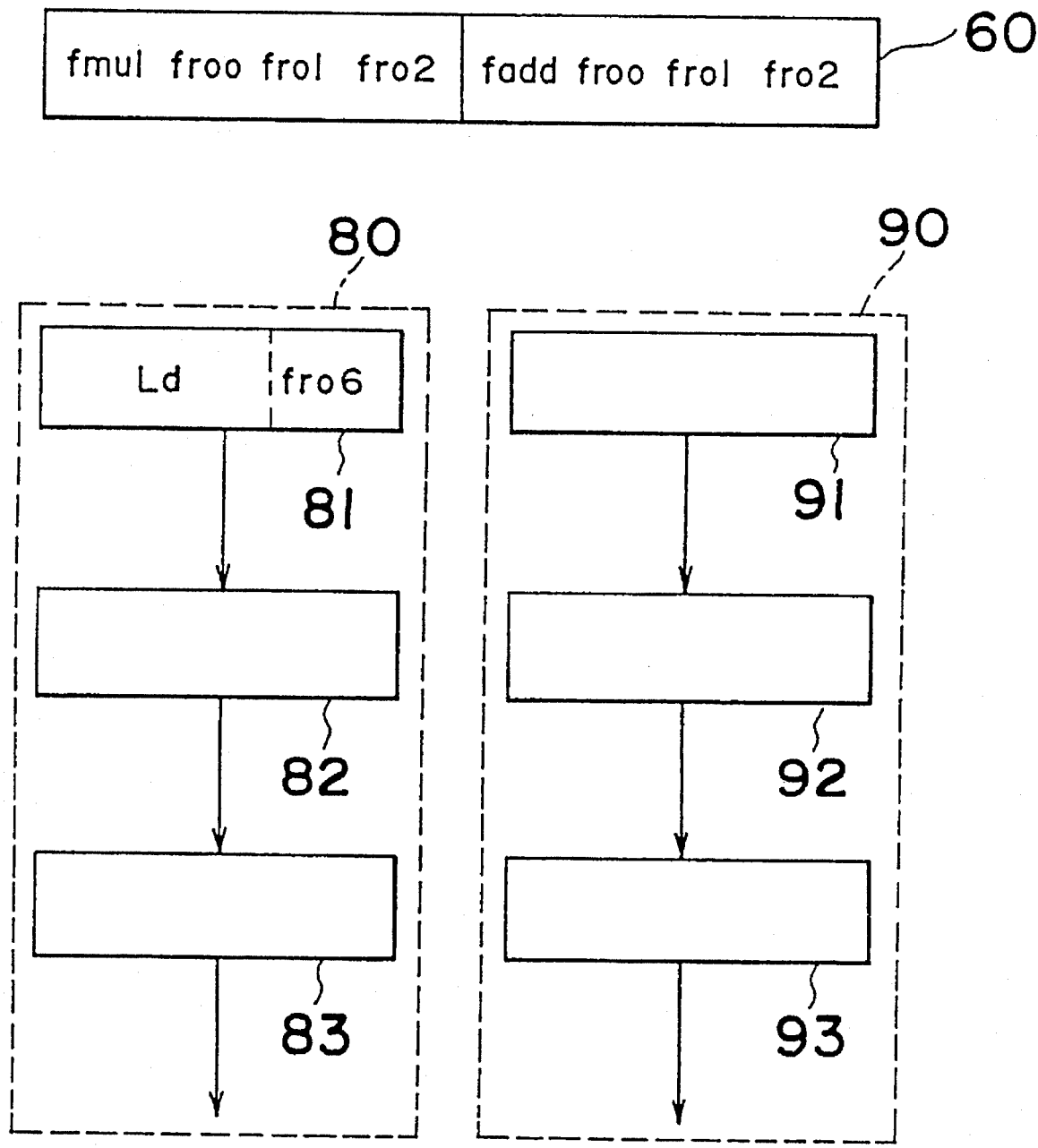
FIGS. 12(a), 12(b) and 12(c) are explanatory diagrams for respectively showing the progressing states of the processing control pipelines when a load instruction is stored in the first stage of the first pipeline and instructions having an output dependency therebetween are registered in the instruction register.
Figure 12B:
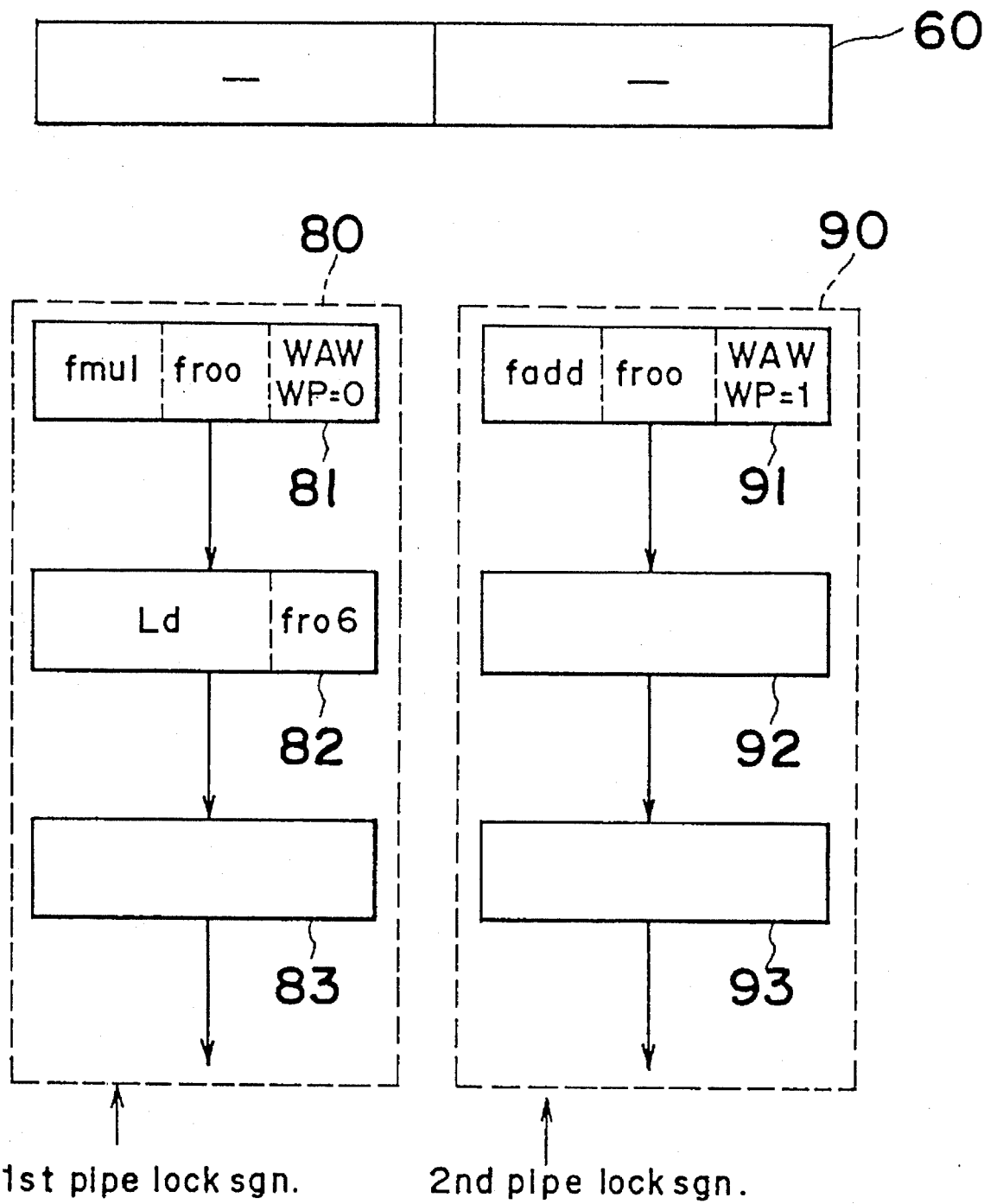
Figure 12C:
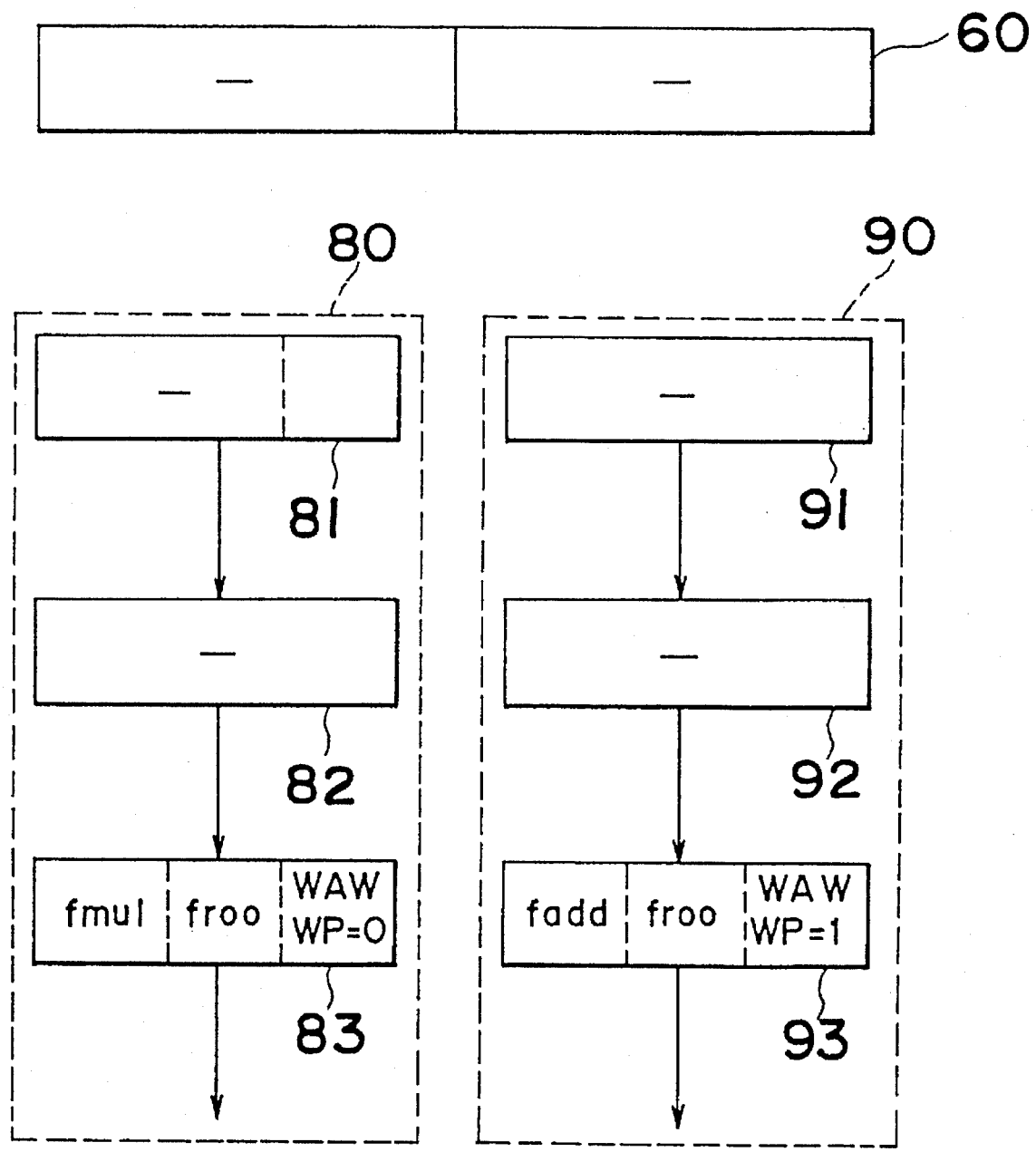

If a WAW tag is added to the instruction in execution, and the WP is low and there is no possibility to demand an exceptional processing, the WAW tag is erased and the WD tag is set.

in FIG. 12(a), an instruction to load is stored in the first stage of the first operation controlling pipeline 80, and two strings of instructions, namely, fmul fr00 fr01 fr02 and fadd fr00 fr03 fr04 are stored in the instruction register 60. An output dependency is present between the two strings of instructions with respect to the register fr00. More specifically, the succeeding instruction fadd cannot write the data into the register fr00 before the preceding instruction fmul completes Writing into the register fr00. Moreover, there is no dependency between the already-issued instruction, i.e., the load instruction Ld and these two instructions. FIG. 12(b) shows the state when the two instructions stored in the instruction register 60 are issued simultaneously. The processor according to the present embodiment can issue an succeeding instruction even with the output dependency. An identifier (WAW: Write After Write) showing an output dependency is added to the operation controlling information of the succeeding instruction, which is stored along with the succeeding instruction in the controlling register 91 in the first stage of the second operation controlling pipeline 90. The writing priority (WP: Write Priority) is set to a higher value "1" in accordance with the order in the instruction strings of the output dependency, which is also stored in the controlling register 91. Similarly, an identifier WAW is added to the preceding instruction fmul in the controlling register 81 of the first stage of the first operation controlling pipeline 80. The WP is set to a lower value "0" and stored in the controlling register 81. According to the present embodiment, if an instruction having an output dependency is present among the processing instructions, the first and second pipeline locking signals are controlled to be output always with the same timing. In other words, when the first pipeline locking signal is output to the first pipeline due to the already-issued load instruction (e.g., wait by cache-miss-hit), the second pipeline locking signal is output with the same timing as the first pipeline locking signal. The second pipeline locking signal is continuously output until the first pipeline locking signal is no longer output. Therefore, the first and second pipelines always process the instructions in a synchronous manner as long as the instructions having the output dependency are present in the pipelines. The reverse is true. FIG. 12(c) shows the state where a pair of instructions having an output dependency are synchronously processed to a third stage. In this state, the WPs of the instructions are compared with each other, and the operation result of the instruction of a higher WP is written into the register. In the above-described manner, the instructions are parallel-processed while the output dependency therebetween is secured.

Figure 19:
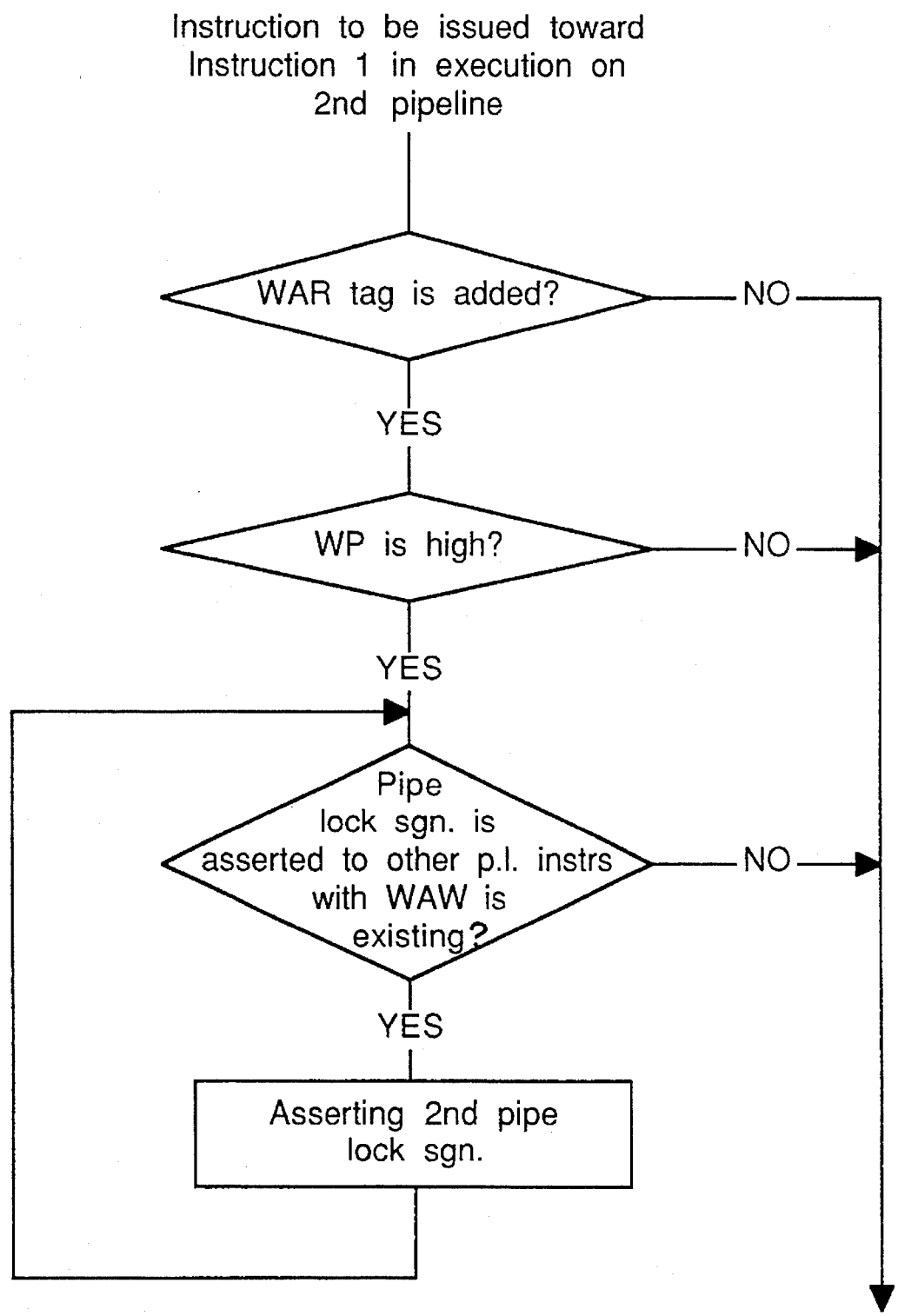
FIG. 19 is a flowchart for generating an n-th pipe lock signal to dissolve the output dependency shown in FIGS. 12(a) to 12(d)

FIG. 19 is a flowchart for generating a second pipe lock signal to eliminate the output dependency as shown in FIGS. 12(a)–12(c). If a WAW tag is added to the instruction being executed in the second operational pipeline, and WP is high and a pipe lock signal is asserted to the other pipeline in which an instruction with WAW is present, then a second pipe lock signal is asserted to the second pipeline.

Figure 13B:
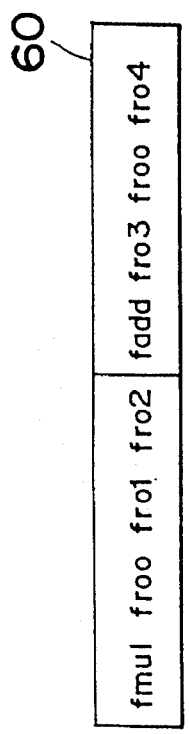
FIGS. 13(a), 13(b), 13(c) and 13(d) are explanatory diagrams for respectively showing the progressing states of the processing control pipelines when instructions having a flow dependency therebetween are fetched in the instruction register.
Figure 13B:
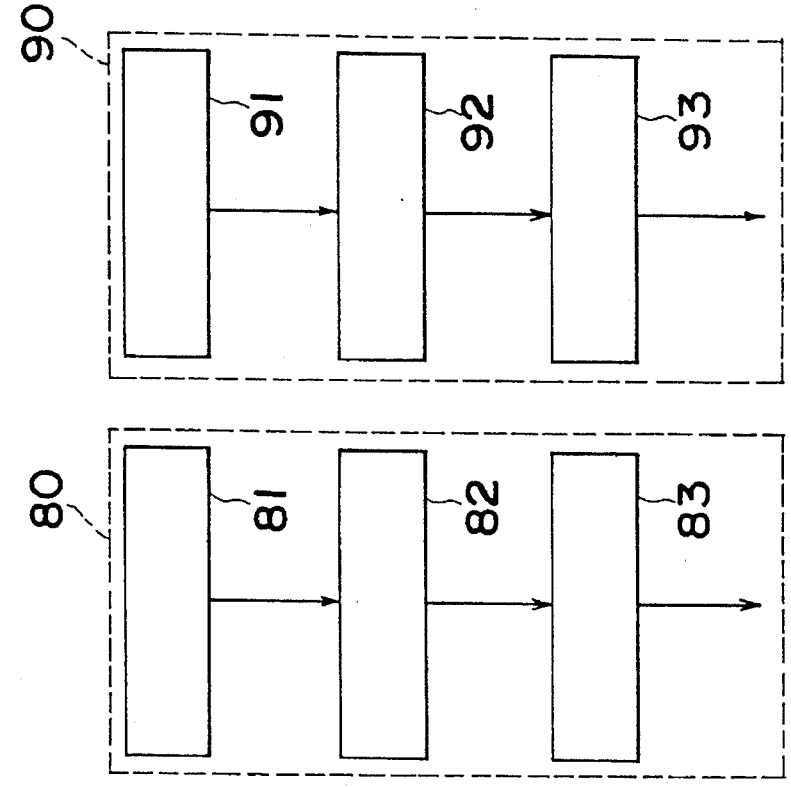
Figure 13A:
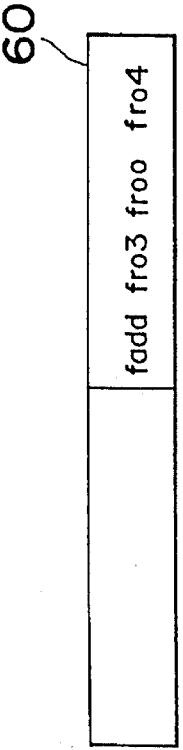
Figure 13A:
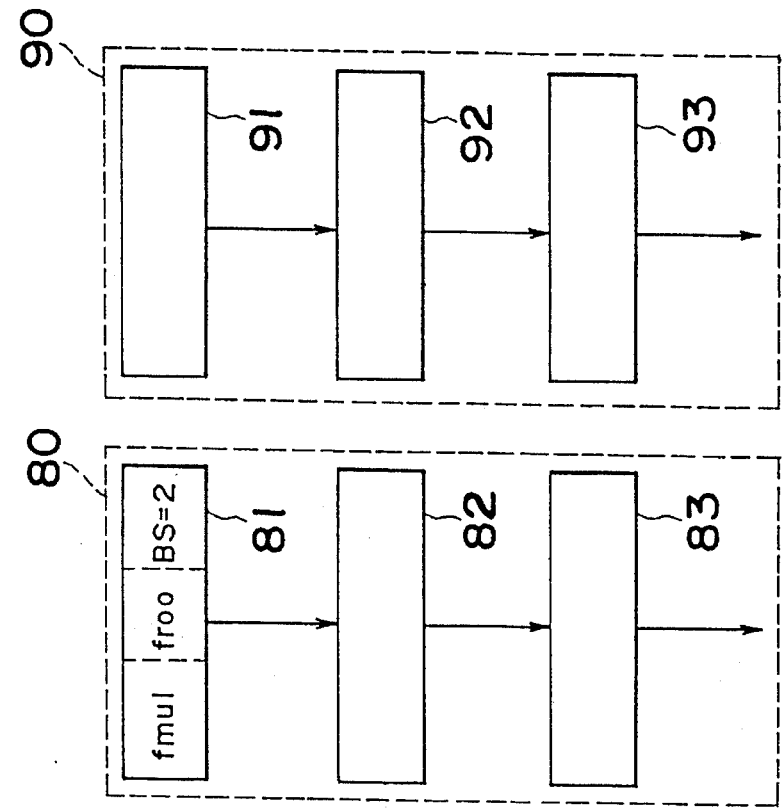
Figure 13D:
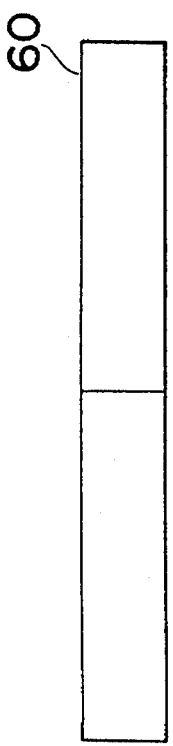
Figure 13D:
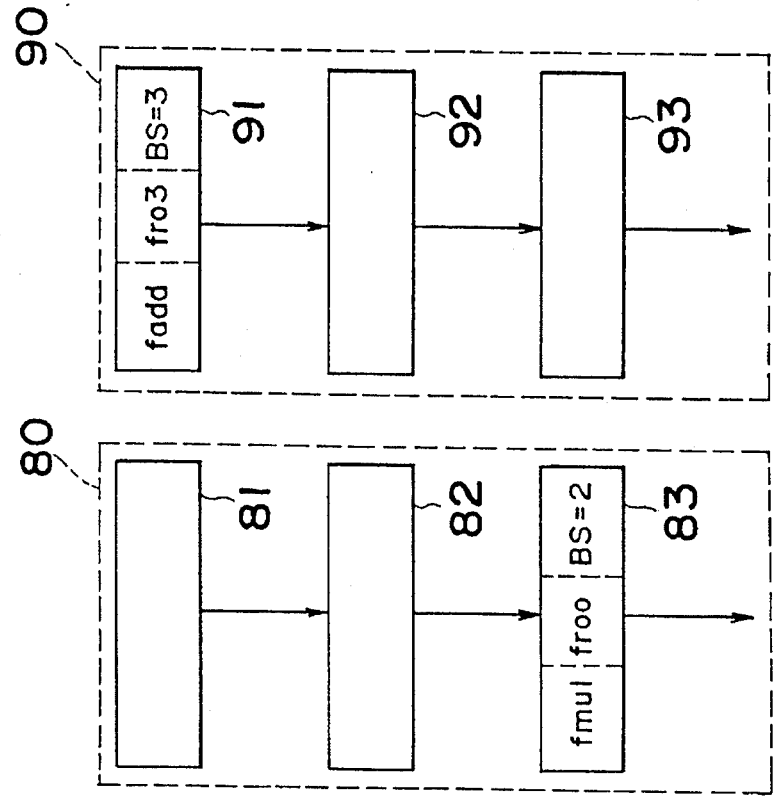
Figure 13C:
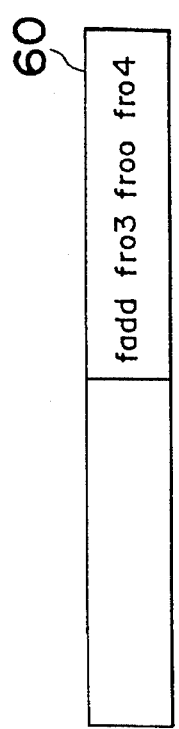
Figure 13C:
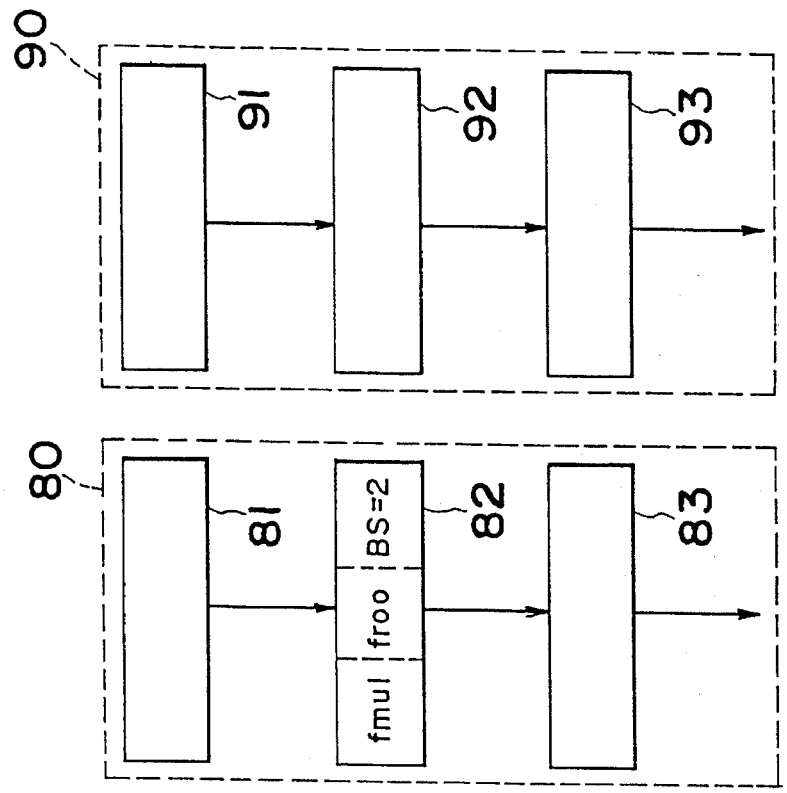

FIG. 13(a) shows the state where two strings of instructions, i.e., fmul fr00 fr01 fr02 and fadd fr03 fr00 fr04, are fetched from an instruction memory to the instruction register 60. A flow dependency is found between the two strings with respect to the register fr00, that is, the succeeding instruction fadd should carry out processing with using of the operation result of the preceding instruction fmul. FIG. 13(b) indicates the state when the preceding instruction fmul is issued. In the operation controlling information for the preceding instruction, an identifier (BS: Bypass Stage) is set to indicate in which of the stages the operation result of the preceding instruction is settled and can be bypassed. In the instant embodiment, BS is set equal to 2, so that the operation result is fixed in the second stage of the pipeline. Since the succeeding instruction fadd cannot be processed without the result of the preceding instruction fmul, the succeeding instruction fadd cannot to be issued in the state indicated in FIG. 13(b). FIG. 13(c) shows the state where the preceding instruction proceeds to the second stage of the pipeline. At this time, since the identifier BS of the preceding instruction fmul agrees with the number of the current stage of the pipeline, the operation result of the preceding instruction is fixed at this stage of the pipeline. Therefore, the result is usable as an input data for the succeeding instruction through the bypass network 40. FIG. 13(d) shows the state where the succeeding instruction fadd is issued. The succeeding instruction fadd is issued using the operation result of the fixed preceding instruction as the input data through the bypass network 40. Accordingly, while flow dependency is secured, the instructions can be parallel-processed even when processing of the preceding instruction is not finished.

Figure 14D:
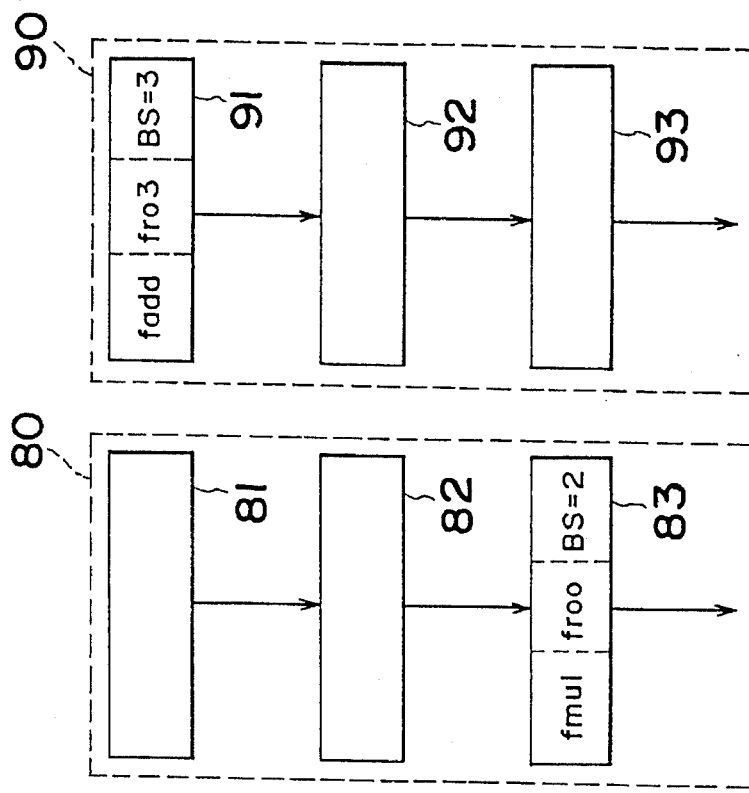
Figure 14C:
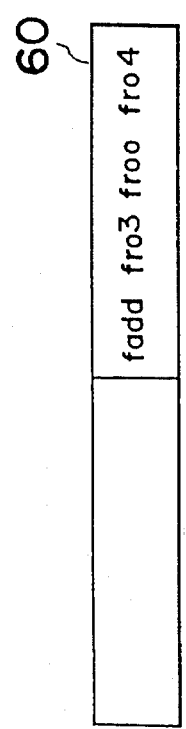

Referring to FIG. 14(a), there is shown the state where two strings of instructions, fmul fr00 fr01 fr02 and fadd fr03 fr00 fr04, are fetched from an instruction memory to the instruction register 60. A flow dependency is present between the two strings of instructions for the register fr00. That is, the succeeding instruction fadd must be processed using the operation result of the preceding instruction fmul. FIG. 14(b) shows the state when the preceding instruction fmul is issued. An identifier (BP: Bypass Stage) is set in the operation controlling information of the preceding instruction to show in which of the stages the preceding instruction is fixed and can be bypassed. In the case of FIG. 14(b), BS is set to 3, meaning that the operation result is fixed in the third stage of the pipeline. Since the succeeding instruction fadd cannot be processed without the result of the preceding instruction fmul, the succeeding instruction fadd cannot be issued in the state shown in FIG. 14(b). FIG. 14(c) is the state where the preceding instruction is advanced to the second stage of the pipeline. Supposing that the operation result of the preceding instruction fmul is fixed at this time point (for example, if one operand is 0, it is easily understood that the operation result becomes 0 even when processing is not performed up to the last stage.), the identifier BS of the preceding instruction fmul may be changed to 2. As a consequence, since the identifier BS of the preceding instruction fmul becomes coincident with the current stage number of the pipeline, the operation result of the preceding instruction is settled at this stage of the pipeline. Accordingly, the result can be used as input data for the succeeding instruction via the bypass network 40, making it possible for the succeeding instruction fadd to be issued using the operation result of the preceding instruction. FIG. 14(d) is illustrative of the state when the succeeding instruction fadd is issued. The succeeding instruction is issued by using and bypassing the operation result of the preceding instruction as a input data when the operation result of the preceding instruction is settled. Accordingly, while the flow dependency is maintained, the instructions can be parallel-processed even if the preceding instruction is not completely processed.

Figure 20:
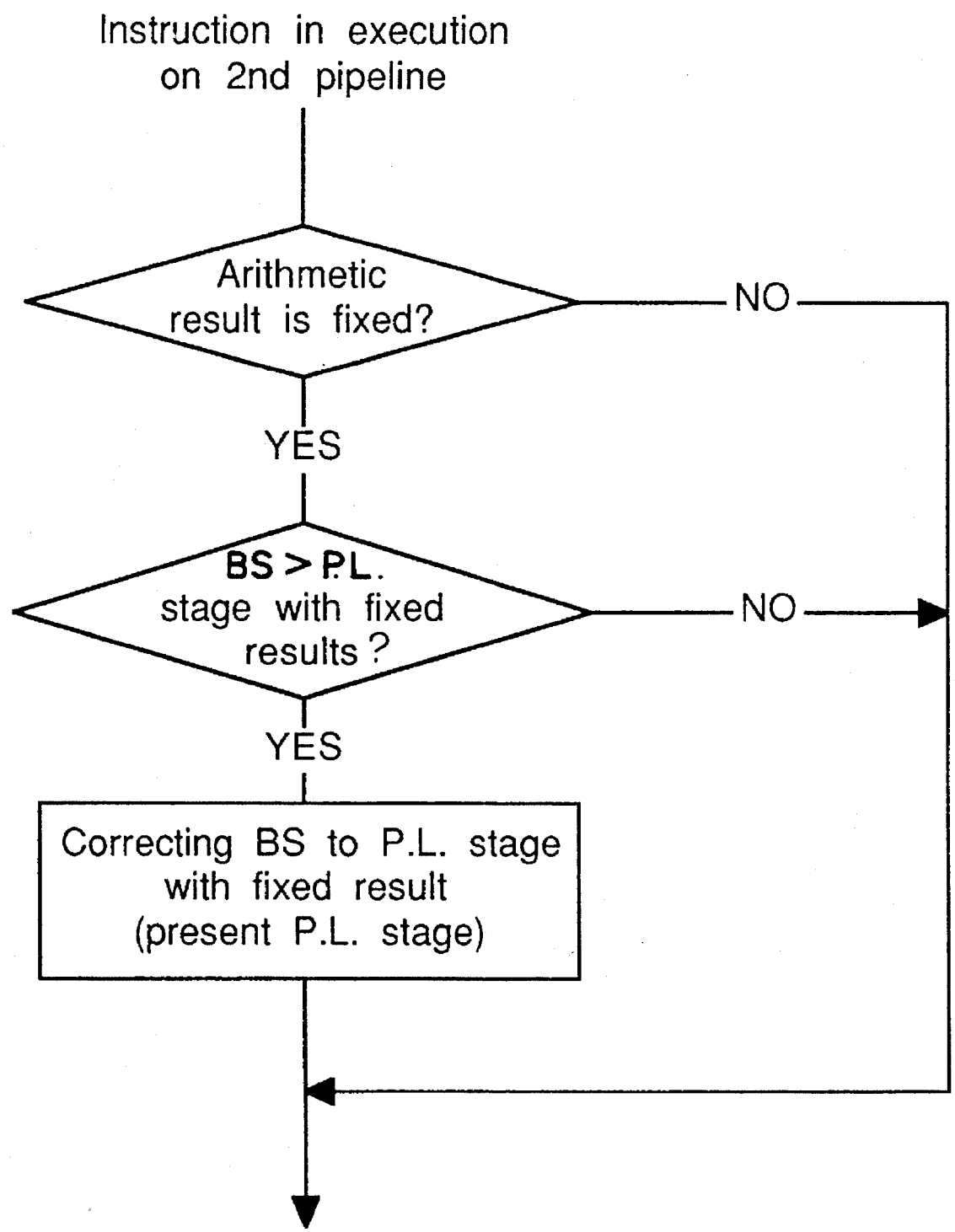
FIG. 20 is a flowchart for altering BS tag to dissolve the flow dependency shown in FIGS. 14(a) to 14(d).

FIG. 20 is a flowchart for altering a BS tag to eliminate the flow dependency shown in FIG. 14(a)–14(d).

If the operation result is fixed in the execution of the instruction of the second pipeline, and the value of BS is larger than a number of the stage in which the operation result has been fixed, the BS tag is changed to the number of that stage.

As is described hereinabove, the processor according to the present invention realizes parallel processing of instructions with a small amount of hardware without deteriorating processing efficiency though the data dependency is secured. Therefore, the processor of the present invention has large practical effects.

Although the present invention has been fully described in connection with the preferred embodiments thereof with reference to the accompanying drawings, it is to be noted that various changes and modifications are apparent to those skilled in the art. Such changes and modifications are to be understood as being included within the scope of the present invention as defined by the appended claims unless they depart therefrom.

What is claimed is:

1. A processor for processing scalars which comprises an instruction processing part and a processing controlling part;

said instruction processing part comprising:

first to Nth operational pipelines each comprising L pipeline stages, wherein L and N are positive integers;

a pair of input data register is provided in first pipeline stage of each of said first to Nth operational pipelines;

first to (L–1)th pipeline registers provided in each of second to Lth pipeline stages of each of said first to Nth operational pipelines;

a data output port provided in said Lth pipeline stage of each said first to Nth operational pipelines;

a register file provided with 2N read ports and N write ports; and a bypass network for inputting data from said data output port of said Lth pipeline stage of each of said first to Nth operational pipelines, from said 2N read ports of said register file and from a data memory as input data, and for respectively outputting optional data selected by a bypass controlling signal from among said input data to said input data registers in each of said first to Nth operational pipelines, to said N write ports of said register file and to said data memory;

said processing controlling part comprising:

M instruction registers for fetching instructions from an instruction memory for storing a sequence of instructions and for storing M (M≧N) instructions, wherein M is a positive integer;

an instruction analyzing part for analyzing said M instructions stored in said M instruction registers and for generating N sets of operation controlling information for controlling said N operational pipelines, respectively;

first to Nth operation controlling pipelines each comprising L pipeline stages and consisting of control registers provided in L pipeline stages, respectively, and storing one of said N sets of operation controlling information generated corresponding to one of said first to Nth operational pipelines;

an instruction issuance controlling part which, using said N sets of operation controlling information generated in said instruction analyzing part and the operation controlling information for each pipeline stage of the pipeline stored in said controlling registers of each of said N operation controlling pipelines, generates said bypass controlling signal and controls an issuance of said instructions by controlling said operation controlling pipelines and said instruction analyzing part; and for generating a pipeline locking signal for prohibiting transfer from a current pipeline stage to a next pipeline stage if said transfer is judged to be prohibited on the basis of said N sets of operation controlling information stored in said M controlling registers of said first to Nth operation controlling pipelines and outputting said pipeline locking signal to corresponding pipelines of said first to Nth operational and operation controlling pipelines and said instruction issuance controlling part;

wherein said instruction issuance controlling part issues a plurality of instructions among said M instructions stored in said M instruction registers provided that each of said plurality of instructions to be issued has no data dependency and no control dependency with respect to already issued and presently executed instructions and not-yet-issued other instructions to be executed later, and that any pipeline locking signals are not generated to operational pipelines to which said plurality of instructions are going to be issued, after adding an identifier indicating presence of a data dependency to operation controlling information.

2. The processor according to claim 1, wherein said instruction issuance controlling part, when said plurality of instructions are judged to be issued, outputs data necessary for executing each of said plurality of instructions to a corresponding operational pipeline to write said data into said pair of input data registers of said corresponding operational pipeline and outputs said operation controlling information necessary for a corresponding operation control pipeline to write it into said control registers of said corresponding operation control pipeline.

3. The processor according to claim 1 wherein, when an instruction having an inverse dependency of the data dependency is present between two arbitrary optional instructions of the M instructions stored in said M instruction registers which have yet to be issued, said instruction issuance controlling part issues succeeding instruction having inverse dependency after adding an identifier which indicates a presence of said inverse dependency to said operation controlling information, whereas, when preceding instruction having said inverse dependency is issued although said succeeding instruction has yet to proceed to final stage of a corresponding operation pipeline, said instruction issuance controlling part resets said identifier added to said operation controlling information of said succeeding instruction; and wherein, when said succeeding instruction proceeds to the final stage of an operation pipeline in the absence of said preceding instruction having said inverse dependency being issued, said pipeline locking signal generating part outputs a pipeline locking signal to operational pipeline to which said succeeding instruction is issued until said preceding instruction is issued.

4. The processor according to claim 1 wherein, when an instruction having an output dependency of the data dependency is detected among said optional instructions which have yet to be issued among said instructions stored in said M instruction registers, already-issued instructions and other yet to be issued instructions stored in said M instruction registers, said instruction issuance controlling part inputs an instruction into a corresponding one of said controlling registers together with an identifier which indicates presence of said output dependency of both the preceding and the succeeding instructions, and a writing priority indicating an order of the writing instructions to said register file which have said output dependency to said operation controlling information used when the instruction is issued or in the operation controlling pipeline, thereby processing said preceding instruction in said corresponding operational pipeline, and at the same time, said instruction issuance controlling part detects a possibility of generation of an exceptional process to operation results in said operational pipeline, so that, in the absence of a possibility of generation of an exceptional process, said instruction issuance controlling part resets said identifier showing the output dependency and adds an identifier to inhibit the writing of the operation controlling information into the register;

wherein, when said succeeding instruction proceeds to the final stage of an operational pipeline and said preceding instruction having the same identifier of the output dependency as said succeeding instruction is present in a stage prior to the final stage of the other operational pipeline, said pipeline locking signal generating part outputs a pipeline locking signal, to an operational pipeline to which said succeeding instruction is issued until said preceding instruction has proceeded to ,said final stage of the operational pipeline;

wherein, when said preceding instruction has proceeded to final stage of said operational pipeline, results of said preceding instruction written into said controlling register if an exceptional process is generated in response to said preceding instruction, whereas the writing priorities in the operation controlling information of said preceding and succeeding-instructions are compared with each other in the absence of an exceptional process being generated in response to said preceding instruction, so that said results of said instruction having a higher writing priority are written into said controlling register.

5. The processor according to claim 1, wherein, when an instruction having output dependency of said data dependency is detected among an optional instruction which has yet to be issued of said M instructions stored in said M instruction registers, already-issued instructions and other yet to be issued instructions stored in said M instruction registers, said instruction issuance controlling part outputs an instruction into the controlling register adding an identifier which indicates said output dependency between the preceding and the succeeding instructions, and a writing priority indicating an order of writing instructions to said register file, so that, when an instruction having identifier of output dependency added thereto is present in one of said controlling registers in first to Nth operation controlling pipelines, pipeline locking signals are synchronized to be output as the signals of the same values with the same timing.

6. A processor for processing scalars which comprises an instruction processing part and a processing controlling part;

said instruction processing part comprising:

first to Nth operational pipelines each comprising L pipeline stages, wherein N and L are positive integers;

a pair of input data registers provided in first pipeline stage of each of said first to Nth operational pipelines;

first to (L−1)th pipeline registers provided in second to Nth pipeline stages of each said first to Nth operational pipelines;

first to Lth data output ports provided in respective pipeline stages of each said first to Nth operation pipelines;

a register file provided with 2N read ports and N write ports; and a bypass network for inputting data from said data output port of said Lth pipeline stage of each of said first to Nth operational pipelines, from said 2N read ports of said register file and from a data memory as input data, and for respectively outputting optional data selected by a bypass controlling signal-from among said .input data to said input data registers in each of said first to Nth operational pipelines, to said N write ports of said register file and to said data memory;

said processing controlling part comprising:

M instruction registers for fetching instructions from an instruction memory for storing a sequence of instructions and for storing M (M≧N) instructions, wherein M is a positive integer;

an instruction analyzing part for analyzing said M instructions stored in said M instruction registers and for generating N sets of operation controlling information for controlling said first to Nth operational pipelines, respectively;

first to Nth operation controlling pipelines each comprising L pipeline stages and consisting of control registers provided in L pipeline stage, respectively, and each storing one of said N sets of operation controlling information generated corresponding each of said first to Nth operational pipelines;

an instruction issuance controlling part which generates said bypass controlling signal using N sets of operation controlling information generated in said instruction analyzing part and said operation controlling information for each pipeline sate of said processing pipeline stored in control registers of each of said N operation controlling pipelines, and controls an issuance of said instructions by controlling said operation controlling pipelines and said instruction analyzing part; and for generating a pipeline locking signal for prohibiting transfer from a current pipeline stage to a next pipeline stage if said transfer is judged to be prohibited on the basis of said N sets of operation controlling information stored in said M controlling registers of said first to Nth operation controlling pipelines and for outputting said pipeline locking signal to corresponding pipelines of said first to Nth operational and operation controlling pipelines and said instruction issuance controlling part;

wherein, when data necessary for an optional operational pipeline to execute an optional instruction from one of said M instruction registers is output and written into a corresponding one of said input data registers, operation controlling information necessary for a corresponding operation controlling pipeline is simultaneously output and written into a corresponding one of said controlling registers, so that optional instruction is completely issued;

Wherein said instruction issuance controlling part issues optional instructions which have yet to be issued among the M instructions stored in said M instruction registers in the absence of data dependencies and control dependencies among already-issued instructions and yet to be issued instructions and in the absence of any pipeline locking signals being to respective operational pipelines to which said optional instructions are to be,issued; and wherein said instruction issuance controlling part issues optional instructions which have yet to be issued among said M instructions stored in said M instruction registers, if there are any optional data dependencies among already-issued instructions and yet to be issued instructions stored and if any pipeline locking signals have failed to be transmitted to respective operational, pipeline to which said optional instructions are to be issued, after adding an identifier indicating presence of a data dependency to operation controlling information.

7. The processor according to claim 6, wherein, said instruction issuance controlling part, when issuing an optional instruction stored in one of said M instruction registers, adds a fixed stage number, indicating which stage an operation result is fixed regardless of input data to a corresponding operation controlling information;

so that, when there is a flow dependency of said data dependency between one of optional instructions which have yet to be issued and one of already-issued instructions, said instruction issuance controlling part compares said fixed stage number in said operation controlling information of said preceding instruction having said flow dependency with current Stage number which said preceding instruction resides in, and if said fixed stage number fails to be larger than said current stage number of the processing pipeline, said instruction issuance controlling part outputs bypass controlling signal to the bypass network, thereby bypassing an operation result of said preceding instruction and outputting succeeding instruction of the flow dependency by using said operation result of said preceding instruction as an input data.

8. The processor according to claim 7, wherein said instruction issuance controlling part, when issuing an optional instruction stored in said M instruction registers, adds the fixed stage number whereby said operation result is fixed regardless of input data to said operation controlling information;

so that, when the operation result of said instruction having said fixing stage number added to said operation controlling information is fixed before said current processing pipeline reaches a fixed stage, said fixed stag number is changed to a stage number of a processing pipeline where instruction is currently present.

* * * * *